United States Patent
Sjöberg et al.

(10) Patent No.: US 10,271,067 B2
(45) Date of Patent: Apr. 23, 2019

(54) ENCODING AND DECODING OF SLICES IN PICTURES OF A VIDEO STREAM USING DIFFERENT MAXIMUM TRANSFORM SIZES

(71) Applicant: Telefonaktiebolaget L M Ericsson (publ), Stockholm (SE)

(72) Inventors: Rickard Sjöberg, Stockholm (SE); Andrey Norkin, Solna (SE); Kenneth Andersson, Gävle (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 139 days.

(21) Appl. No.: 14/389,927

(22) PCT Filed: Oct. 23, 2013

(86) PCT No.: PCT/SE2013/051237
§ 371 (c)(1),
(2) Date: Oct. 1, 2014

(87) PCT Pub. No.: WO2014/107121
PCT Pub. Date: Oct. 7, 2014

(65) Prior Publication Data
US 2015/0092861 A1  Apr. 2, 2015

Related U.S. Application Data

(60) Provisional application No. 61/749,499, filed on Jan. 7, 2013.

(51) Int. Cl.
*H04N 19/122* (2014.01)
*H04N 19/159* (2014.01)
(Continued)

(52) U.S. Cl.
CPC .......... *H04N 19/60* (2014.11); *H04N 19/115* (2014.11); *H04N 19/122* (2014.11);
(Continued)

(58) Field of Classification Search
CPC .. H04N 19/115; H04N 19/122; H04N 19/159; H04N 19/174; H04N 19/179; H04N 19/19; H04N 19/60; H04N 19/70
(Continued)

(56) References Cited

U.S. PATENT DOCUMENTS 9,036,712 B1 * 5/2015 Cote ................... H04N 19/139
375/240.24
2005/0249291 A1 * 11/2005 Gordon ............... H04N 19/159
375/240.18
(Continued)

FOREIGN PATENT DOCUMENTS

RU      2009130382 A    2/2011
WO   WO 2012/122355 A1  9/2012

OTHER PUBLICATIONS

Recommendation ITU-R BT.500-13, "Methodology for subjective assessment of the quality of the television pictures", BT Series Broadcasting service (television); Jan. 2012; 46 pages.
(Continued)

*Primary Examiner* — Jamie J Atala
*Assistant Examiner* — James T Boylan
(74) *Attorney, Agent, or Firm* — Sage Patent Group

(57) ABSTRACT

Visible artifacts in a video stream of pictures with slices are reduced by having a separate maximum transform size for intra coding units in inter coded slices as compared to intra coding units in intra coded slices and/or inter coding units or by penalizing the usage of large transform size for such intra coding units in inter coded slices as compared to intra coding units in intra coded slices and/or inter coding units.

29 Claims, 10 Drawing Sheets

(51) Int. Cl.
*H04N 19/60* (2014.01)
*H04N 19/70* (2014.01)
*H04N 19/19* (2014.01)
*H04N 19/115* (2014.01)
*H04N 19/174* (2014.01)
*H04N 19/179* (2014.01)

(52) U.S. Cl.
CPC ......... *H04N 19/159* (2014.11); *H04N 19/174* (2014.11); *H04N 19/19* (2014.11); *H04N 19/70* (2014.11); *H04N 19/179* (2014.11)

(58) Field of Classification Search
USPC .................................................... 375/240.18
See application file for complete search history.

(56) References Cited

U.S. PATENT DOCUMENTS

| | | | | |
|---|---|---|---|---|
| 2009/0103820 A1* | 4/2009 | Chang | ................ | H04N 19/176 |
| | | | | 382/237 |
| 2010/0303153 A1* | 12/2010 | Kadono | ................ | H04N 19/61 |
| | | | | 375/240.13 |
| 2011/0135000 A1* | 6/2011 | Alshina | ................ | H04N 19/105 |
| | | | | 375/240.13 |
| 2011/0317757 A1* | 12/2011 | Coban | ................ | H04N 19/197 |
| | | | | 375/240.02 |
| 2012/0033731 A1* | 2/2012 | Yamamoto | ....... | H04N 19/00072 |
| | | | | 375/240.12 |
| 2012/0082225 A1* | 4/2012 | Chen | ................ | H04N 19/70 |
| | | | | 375/240.12 |
| 2012/0087410 A1 | 4/2012 | Gordon et al. | | |
| 2012/0230411 A1 | 9/2012 | Liu et al. | | |
| 2012/0320984 A1* | 12/2012 | Zhou | ................ | H04N 19/50 |
| | | | | 375/240.16 |
| 2013/0003828 A1* | 1/2013 | Cohen | ................ | H04N 19/60 |
| | | | | 375/240.12 |
| 2013/0089145 A1* | 4/2013 | Guo | ................ | H04N 19/176 |
| | | | | 375/240.12 |
| 2013/0094572 A1* | 4/2013 | Van der Auwera | ................ | |
| | | | | H04N 19/00096 |
| | | | | 375/240.03 |
| 2013/0128971 A1* | 5/2013 | Guo | ................ | H04N 19/00781 |
| | | | | 375/240.12 |
| 2014/0086311 A1* | 3/2014 | Lou | ................ | H04N 19/30 |
| | | | | 375/240.03 |
| 2014/0086314 A1* | 3/2014 | Hebel | ................ | H04N 19/70 |
| | | | | 375/240.04 |
| 2014/0119454 A1* | 5/2014 | Hebel | ................ | H04N 19/147 |
| | | | | 375/240.18 |
| 2016/0191944 A1* | 6/2016 | Oh | ................ | H04N 19/107 |
| | | | | 375/240.16 |

OTHER PUBLICATIONS

Bossen et al: "HM Software Manual"; Joint Collaborative Team on Video Coding (JCT-VC) of ITU-T SG16 WP3 and ISO/IEC JTC1/SC29/WG11; Document: JCTVC-Software Manual; HEVC project version 11.0; May 28, 2013; 18 pages.

Norkin et al.: "AHG6: On deblocking filter and parameters signaling"; Joint Collaborative Team on Video Coding (JCT-VC) of ITU-T SG16 WP 3 and ISO/IEC JTC 1/SC 29/WG 11 $12^{th}$ Meeting: Geneva, CH, Jan. 14-23, 2013; Document: JCTVC-L0232; Jan. 8, 2013; 7 pages.

Norkin et al.: "AHG6: On deblocking filter and parameters signaling"; Joint Collaborative Team on Video Coding (JCT-VC) of ITU-T SG16 WP 3 and ISO/IEC JTC 1/SC 29/WG 11 $12^{th}$ Meeting: Geneva, CH, Jan. 14-23, 2013; Document: JCTVC-L0232 r6; Jan. 18, 2013; 16 pages.

Norkin: "CE1: Reduction of block artifacts in HEVC"; Joint Collaborative Team on Video Coding (JCT-VC) of ITU-T SG16 WP 3 and ISO/IEC JTC 1/SC 29/WG 11, $11^{th}$ Meeting: Shanghai, CN, Oct. 10-19, 2012; Document: JCTVC-K0186; Oct. 1, 2012; 33 pages.

E. D. Gelasca: "Full-reference objective quality metrics for video watermarking, video segmentation and 3D model watermarking", Ph.D. thesis, EPFL, Sep. 2005.

F. D. Simone et al.: "Subjective quality assessment of H.264/AVC video streaming with packet losses", Hindawi Publishing Corporation, EURASIP Journal on Image and Video Processing, vol. 2011, Article ID 190431, Jan. 18, 2011, 12 pages.

Office Action with Search Report corresponding to Russian Application No. 2015132979; dated Oct. 24, 2015; 5 Pages.

* cited by examiner

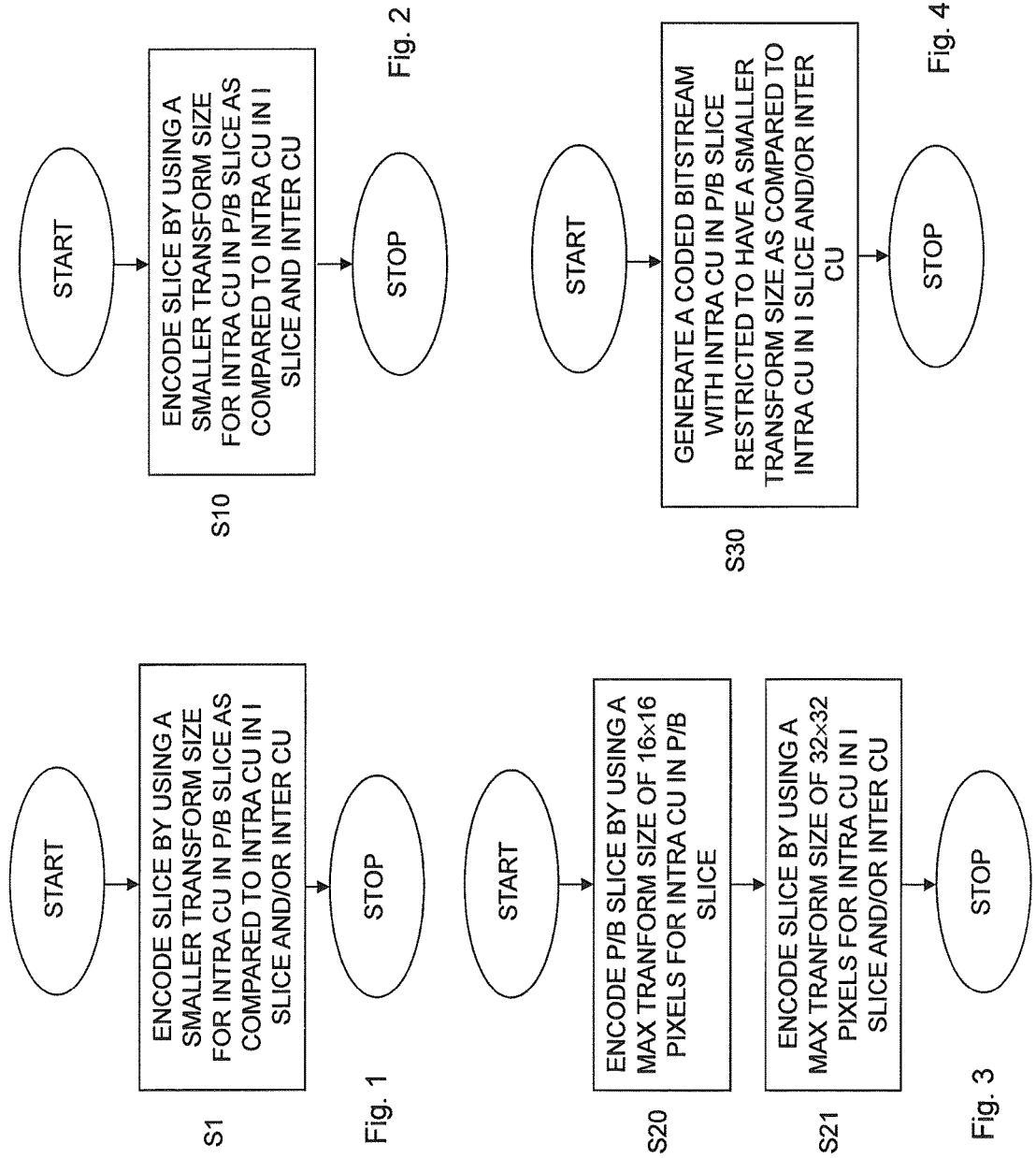

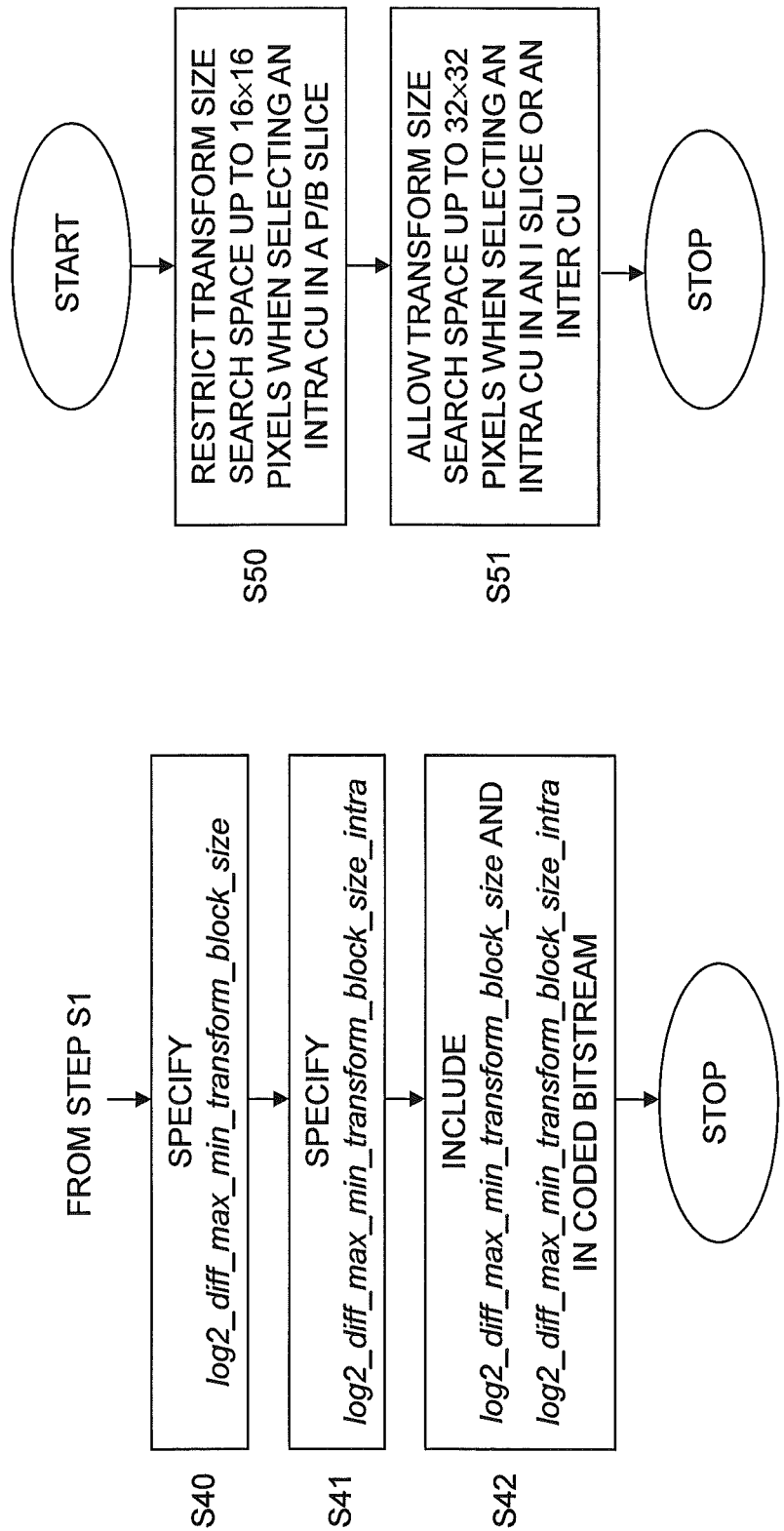

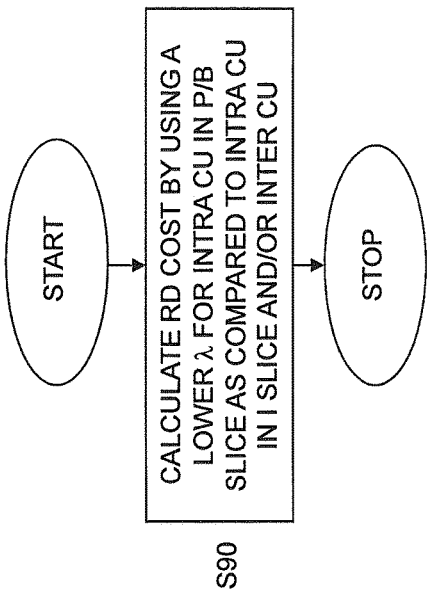
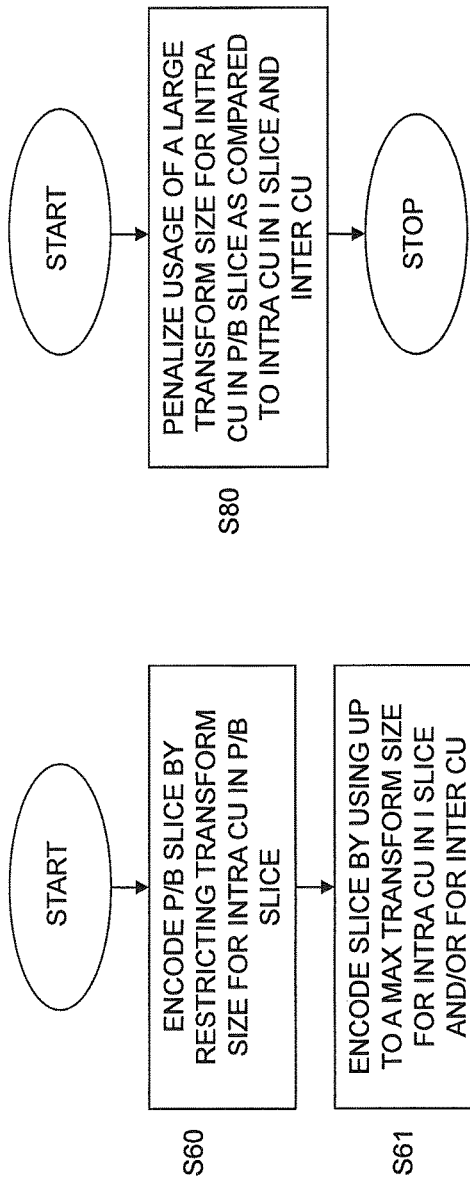
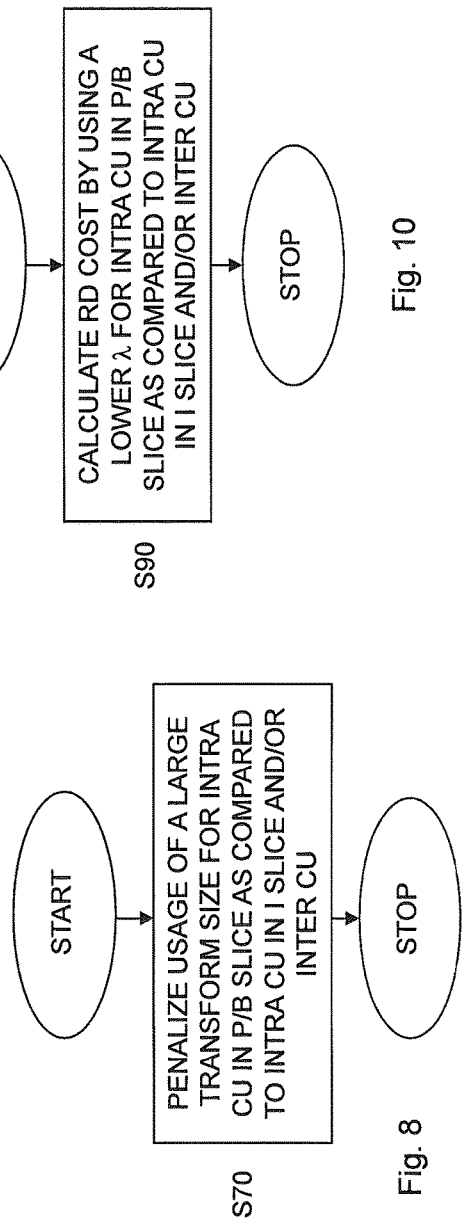

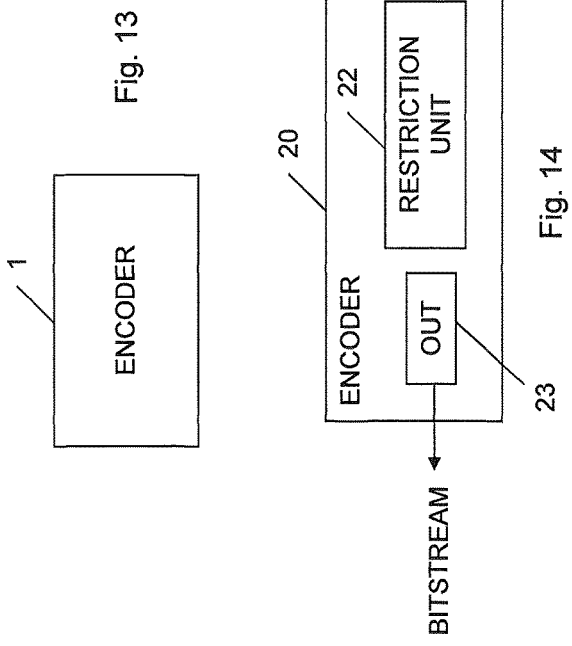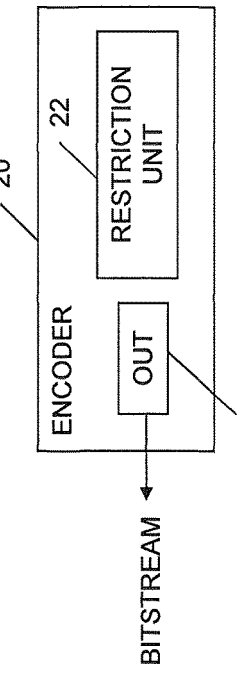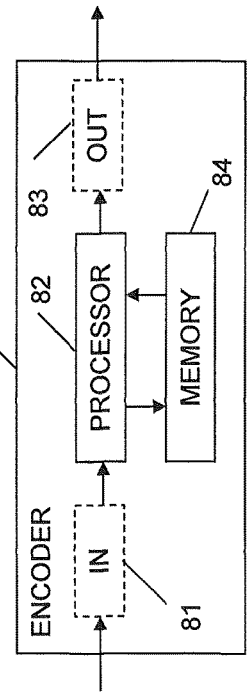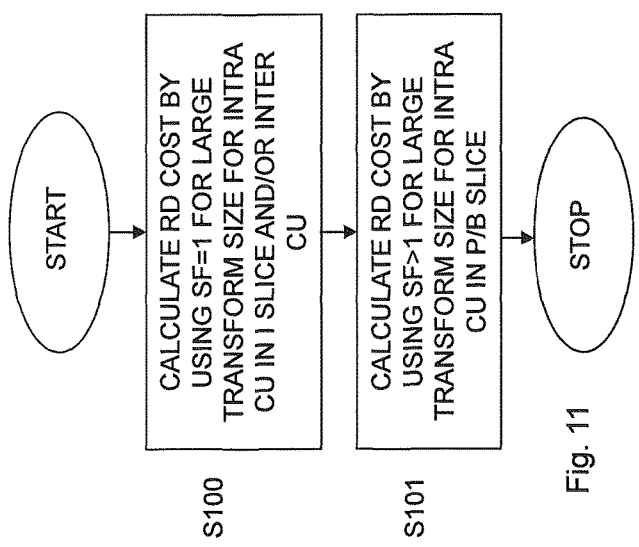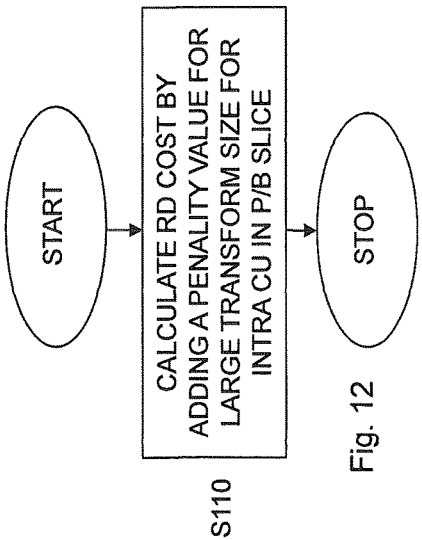

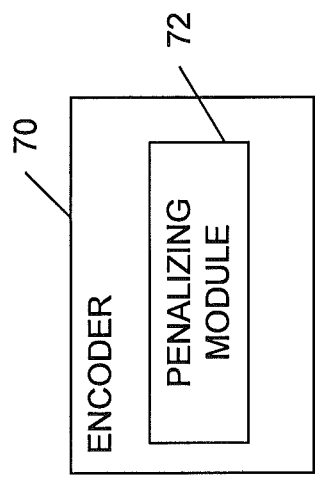
Fig. 17
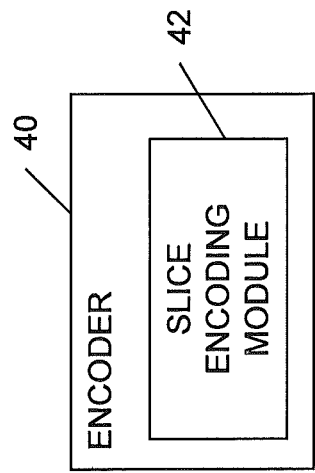
Fig. 16
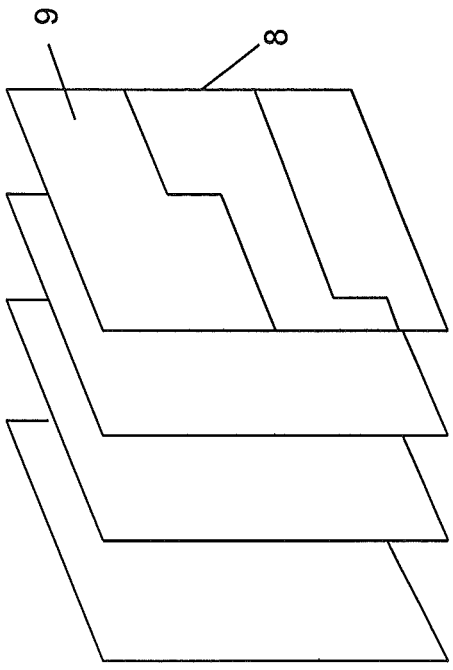
Fig. 27
Fig. 26
Fig. 25

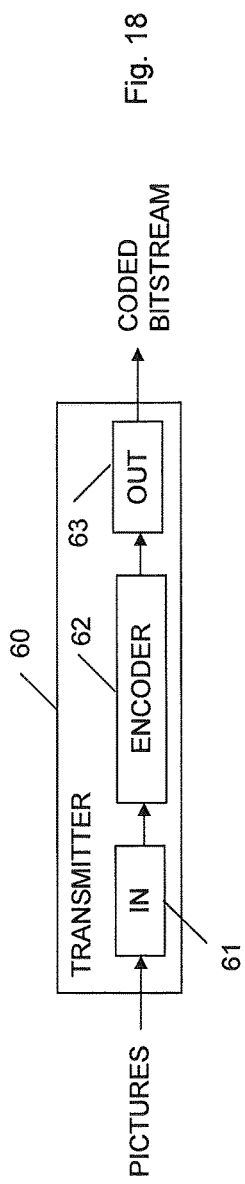
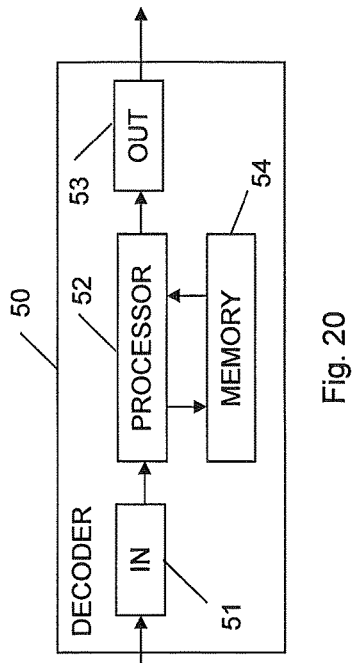
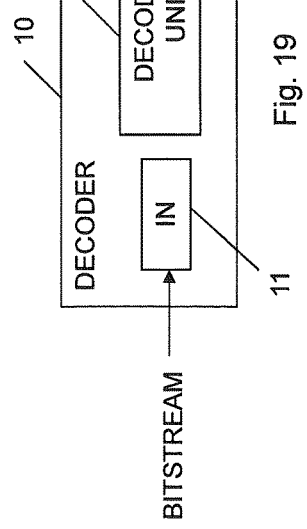
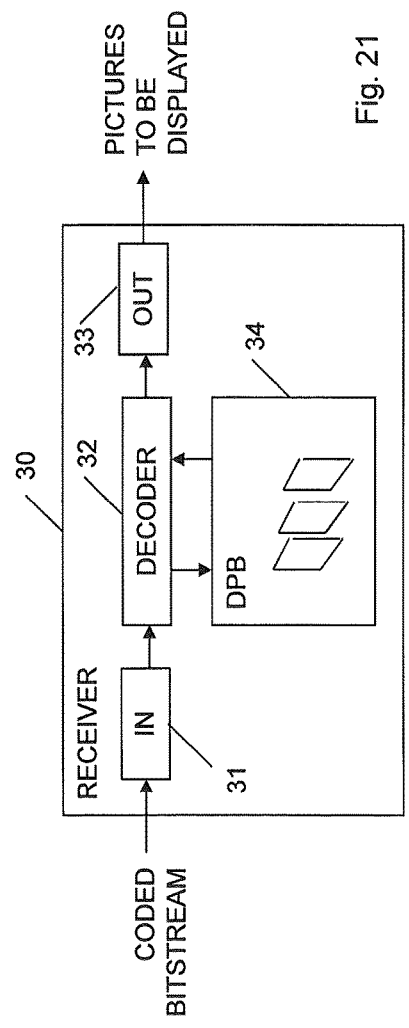

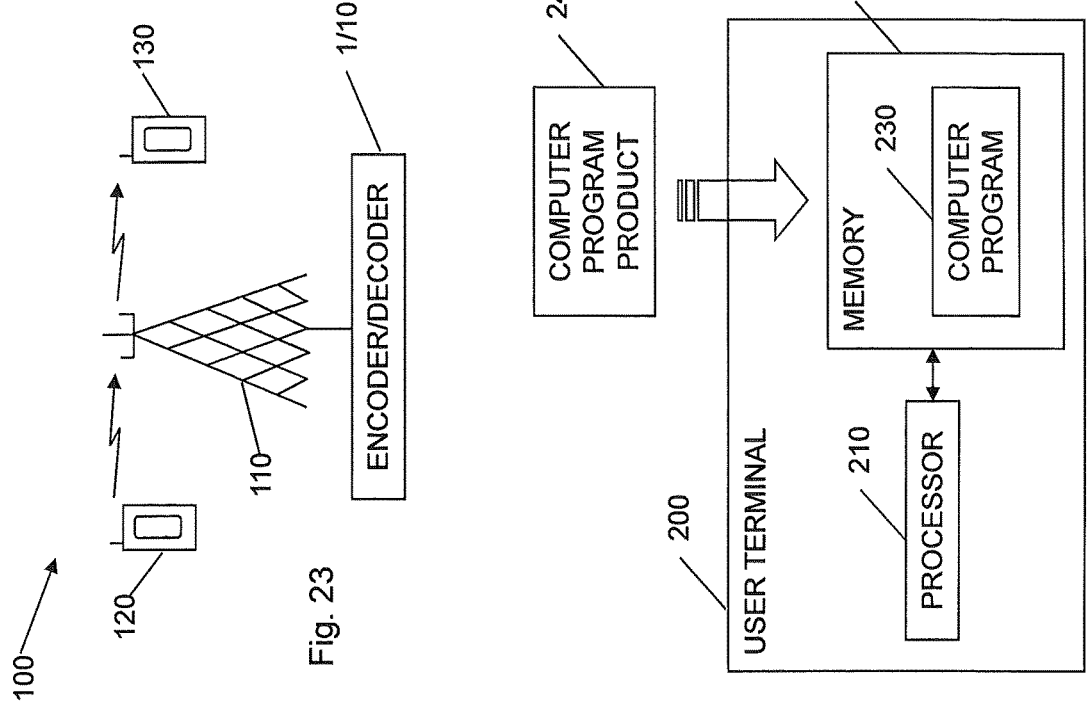
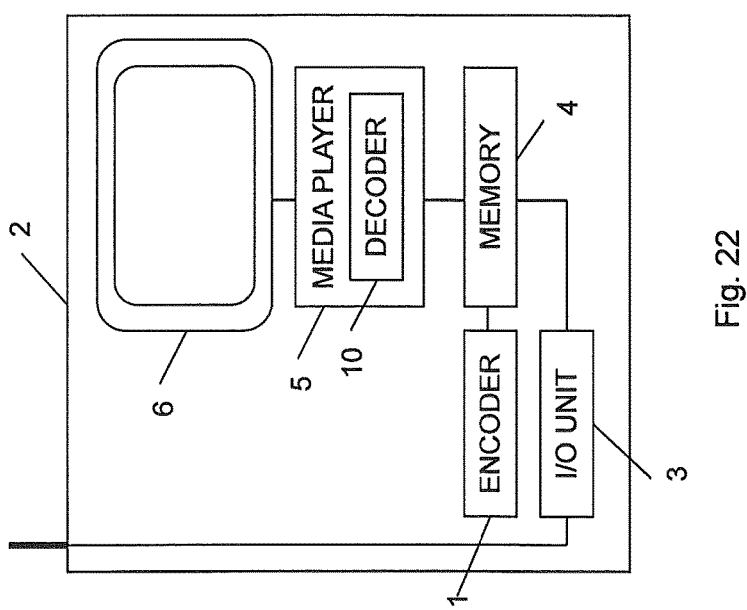

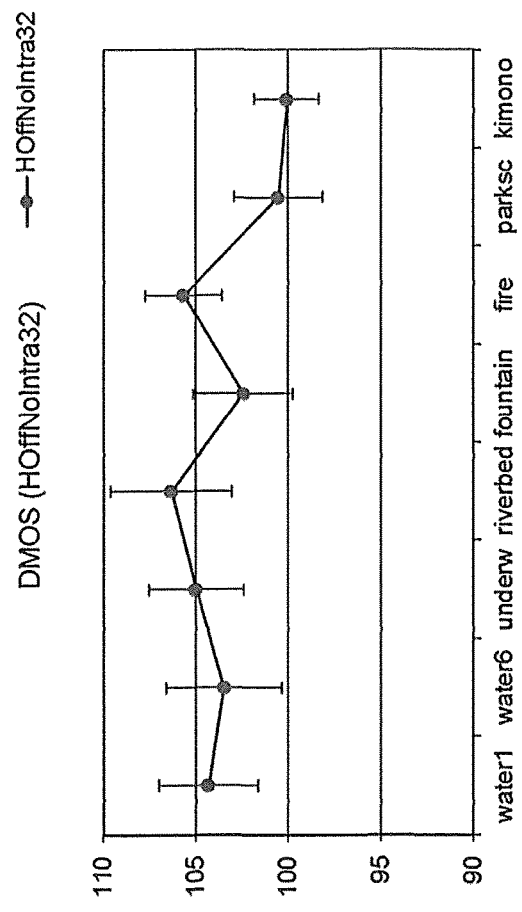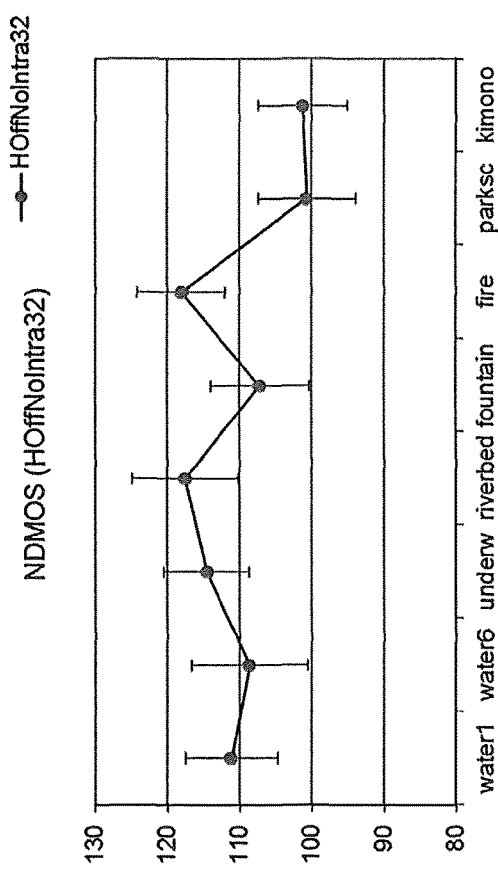
Fig. 29A
Fig. 29B

US 10,271,067 B2

ENCODING AND DECODING OF SLICES IN PICTURES OF A VIDEO STREAM USING DIFFERENT MAXIMUM TRANSFORM SIZES

CROSS REFERENCE TO RELATED APPLICATION

This application is a 35 U.S.C. § 371 national stage application of PCT International Application No. PCT/SE2013/051237, filed in the English language on 23 Oct. 2013, which itself claims the benefit of U.S. provisional Patent Application No. 61/749,499, filed 7 Jan. 2013, the disclosures and contents of both of which are incorporated by reference herein in their entirety.

TECHNICAL FIELD

The embodiments generally relate to encoding and decoding of slices in pictures of a video stream.

BACKGROUND

In the video coding standard High Efficiency Video Coding (HEVC), also referred to as H.265, each picture is divided into coding units (CU). Typical maximum size is 64×64 pixels. The coding units are hierarchically quad-tree split, which means that a picture may consist of a mix of coding units of sizes 64×64, 32×32, 16×16 and 8×8 pixels. Each coding unit can be divided into intra or inter coding units. A coding unit can then be divided into prediction units (PUs) each with a specific prediction mode. The coding unit can also be divided into transform units (TU). The maximum transform size is defined in the bitstream. In HEVC, the same restriction applies for both intra and inter coded TUs and this restricted transform size is fixed for the whole video sequence. Maximum transform size in HEVC is 32×32 pixels. JCTVC-K1003_v13, B. Bross et al., High Efficiency Video Coding (HEVC) text specification draft 9, Joint Collaborative Team on Video Coding (JCT-VC) of ITU-T SG16 WP3 and ISO/IEC JTC1/SC29/WG11, 11$^{th}$ Meeting: Shanghai, China, 10-19 Oct. 2012, section 7.4.2.2 on page 67 provides more information of maximum transform size according to prior art.

Large transforms can effectively reduce the overhead for coding transform coefficients. Transform units are also hierarchically split, which means that a picture may consist of a mix of transform unit sizes of 32×32, 16×16 and 8×8 pixels.

The pictures in HEVC can be divided into different types of slices.

An I slice is a part of a picture that only contains blocks of pixels, i.e. intra coding units, which are predicted from previously reconstructed pixels of the current picture. These slices are also called intra coded slices.

A P slice is a part of a picture that contains blocks of pixels, i.e. inter coding units, which are predicted from one reference frame, and possibly blocks of pixels, i.e. intra coding units, which are predicted from previously reconstructed pixels of the current picture.

A B slice is a part of a picture that contains blocks of pixels, i.e. inter coding units, which are predicted from one or two reference frames, and possibly block of pixels, i.e. intra coding units, which are predicted from previously reconstructed pixels of the current picture.

Slices that are not I slices are called inter coded slices. P slices and B slices are examples of inter coded slices.

Unfortunately, visual artifacts can be seen for some difficult to encode content in HEVC, such as water, fire, smoke, etc. Hence, there is a need for encoding and decoding of video streams that combat or at least reduce visual artifacts seen in prior art video encoding and decoding solutions.

SUMMARY

It is a general objective to reduce visible artifacts in connection with video encoding and decoding.

This and other objectives are met by embodiments disclosed herein.

An aspect of the embodiments relates to a method performed by an encoder comprising the encoder encoding at least one slice in at least one picture of a video stream by using a smaller maximum transform size for intra coding units in an inter coded slice as compared to intra coding units in an intra coded slice and/or inter coding units.

A related aspect of the embodiments defines an encoder operable to encode at least one slice in at least one picture of a video stream by using a smaller maximum transform size for intra coding units in an inter coded slice as compared to intra coding units in an intra coded slice and/or inter coding units.

Another related aspect of the embodiments defines an encoder comprising a slice encoding module for encoding at least one slice in at least one picture of a video stream by using a smaller maximum transform size for intra coding units in an inter coded slice as compared to intra coding units in an intra coded slice and/or inter coding units.

A further related aspect of the embodiments defines a computer program comprising code means which when executed by a processor causes the processor to encode at least one slice in at least one picture of a video stream by using a smaller maximum transform size for intra coding units in an inter coded slice as compared to intra coding units in an intra coded slice and/or inter coding units.

Another aspect of the embodiments relates to a method performed by an encoder comprising the encoder penalizing usage of a large transform size for intra coding units in an inter coded slice in at least one picture of a video stream as compared to intra coding units in an intra coded slice and/or inter coding units when calculating a rate-distortion cost for encoding a slice according to different encoding modes.

A related aspect of the embodiments defines an encoder operable to penalize usage of a large transform size for intra coding units in an inter coded slice in at least one picture of a video stream as compared to intra coding units in an intra coded slice and/or inter coding units when calculating a rate-distortion cost for encoding a slice according to different encoding modes.

Another related aspect of the embodiments defines an encoder comprising a penalizing module for penalizing usage of a large transform size for intra coding units in an inter coded slice in at least one picture of a video stream as compared to intra coding units in an intra coded slices and/or inter coding units when calculating a rate-distortion cost for encoding a slice according to different encoding modes.

A further related aspect of the embodiments defines a computer program comprising code means which when executed by a processor causes the processor to penalize usage of a large transform size for intra coding units in an inter coded slice in at least one picture of a video stream as compared to intra coding units in an intra coded slice and/or inter coding units when calculating a rate-distortion cost for encoding a slice according to different encoding modes.

Further aspects of the embodiments include a computer program product comprising computer-readable medium and a computer program according to above stored on the computer-readable medium. These further aspects also include a transmitter comprising an input unit operable to receive pictures of a video stream. The transmitter also comprises an encoder according to above connected to the input unit and an output unit connected to the encoder and operable to output a coded bistream with encoded representations of the pictures in the video stream.

The embodiments enable reduction in visible artifacts for at least some pictures of a video stream by restricting or penalizing usage of a large transform size for intra coding units in inter coded slices of the video stream.

BRIEF DESCRIPTION OF THE DRAWINGS

The embodiments, together with further objects and advantages thereof, may best be understood by making reference to the following description taken together with the accompanying drawings, in which:

FIG. 1 is a flow diagram illustrating a method performed by an encoder according to an embodiment;

FIG. 2 is a flow diagram illustrating an embodiment of the method in FIG. 1;

FIG. 3 is a flow diagram illustrating another embodiment of the method in FIG. 1;

FIG. 4 is a flow diagram illustrating a further embodiment of the method in FIG. 1;

FIG. 5 is a flow diagram illustrating additional, optional steps of the method in FIG. 1 according to an embodiment;

FIG. 6 is a flow diagram illustrating yet another embodiment of the method in FIG. 1;

FIG. 7 is a flow diagram illustrating a further embodiment of the method in FIG. 1;

FIG. 8 is a flow diagram illustrating a method performed by an encoder according to another embodiment;

FIG. 9 is a flow diagram illustrating an embodiment of the method in FIG. 8;

FIG. 10 is a flow diagram illustrating another embodiment of the method in FIG. 8;

FIG. 11 is a flow diagram illustrating a further embodiment of the method in FIG. 8;

FIG. 12 is a flow diagram illustrating yet another embodiment of the method in FIG. 8;

FIG. 13 is a schematic block diagram of an encoder according to an embodiment;

FIG. 14 is a schematic block diagram of an encoder according to another embodiment;

FIG. 15 is a schematic block diagram of an encoder according to a further embodiment;

FIG. 16 is a schematic block diagram of an encoder according to yet another embodiment;

FIG. 17 is a schematic block diagram of an encoder according to a further embodiment;

FIG. 18 is a schematic block diagram of a transmitter according to an embodiment;

FIG. 19 is a schematic block diagram of a decoder according to an embodiment;

FIG. 20 is a schematic block diagram of a decoder according to another embodiment;

FIG. 21 is a schematic block diagram of a receiver according to an embodiment;

FIG. 22 is a schematic block diagram of a mobile device according to an embodiment;

FIG. 23 is an overview of a communication network comprising a network node according to an embodiment;

FIG. 24 is a schematic block diagram of a user terminal according to an embodiment;

FIG. 25 illustrates a portion of a slice in an intra coded picture;

FIG. 26 illustrates a portion of a slice in an inter coded picture;

FIG. 27 schematically illustrates a portion of a video stream of pictures;

FIGS. 29A and 29B illustrate test results based on raw scores (FIG. 29A) and normalized scores (FIG. 29B)

DETAILED DESCRIPTION

Figure 28A:
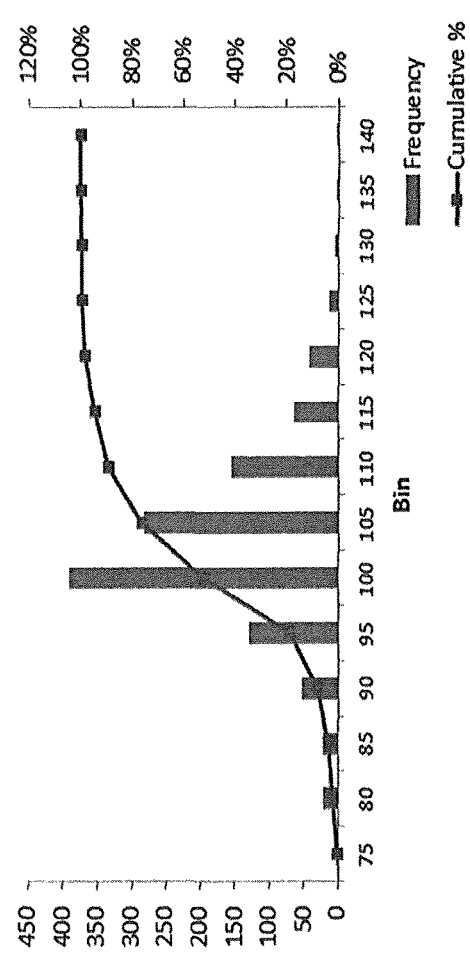
FIGS. 28A and 28B are histogram showing distribution of raw scores (FIG. 28A) and normalized scores (FIG. 28B)

Throughout the drawings, the same reference numbers are used for similar or corresponding elements.

The embodiments generally relate to encoding and decoding of slices in pictures of a video stream. In particular, the embodiments relate to restricting the use of large transforms for certain coding units in selected slices in pictures of a video stream as a means to combat or at least reduce visual artifacts that otherwise can be seen, in particular, for some difficult to encode content like water, fire, smoke, etc.

The prior art video encoding and decoding, such as represented by HEVC and H.265, uses a same maximum transform size for all types of coding units, i.e. for both intra and inter coding units and for intra (I) and inter (P and B) coded slices. Hence, in HEVC intra coded coding units (CUs) can have transform of size 32×32, which is the maximum transform size in HEVC. However, allowing transform units (TUs) of this maximum transform size, i.e. 32×32 pixels, can cause visual annoying artifacts when intra coded CUs are used in inter coded slices, e.g. slices other than intra coded slices, for some content.

Accordingly, an object of the embodiments is to reduce such visual artifacts. This is achieved by restricting the use of large transforms, for example 32×32 transforms, for intra coding units in inter coded slices, for instance in HEVC, to a smaller transform size, for example 16×16. Preferably, maximum transform size for intra coding units in intra coded slices and/or for inter coding units can be kept at the maximum transform size defined in HEVC, i.e. 32×32 transform size, to maintain the coding efficiency of large transforms.

Generally within the art of video coding and in particular HEVC, a coding unit (CU) is a coding block of luma (luminescence) samples, also denoted pixels in the art, and two corresponding coding blocks of chroma (chrominance) samples of a picture, or a coding block of samples of a monochrome pictures or a picture that is coded using three separate color planes. A coding block (CB) is an N×N block of samples (block of pixels), such as an N×N block of luma samples or an N×N block of chroma samples.

A coding unit can have a size ranging from a maximum CU size, i.e. a largest coding unit (LCU), such as 64×64 pixels or samples, down to a smallest CU size, i.e. a smallest coding unit (SCU), such as 8×8 pixels or samples. The coding units can be hierarchical split in a quad-tree manner, which implies that a given CU of N×N pixels can be split into four CUs of N/4×N/4 pixels, each of which may in turn be independently split further into four CUs and so on until reaching the smallest CU size, i.e. SCU.

The art of video coding typically uses a color format, in which the values of pixels or samples of a picture are represented. Examples of such a color format is the red, green, blue (RGB) color format and various luminance+chrominance formats, such as Y'CrCb, YUV, YIQ, xvYCC, etc. Luminance+chrominance could, for instance, be represented as Y'CrCb 4:4:4 or if chroma subsampling is used as, for instance, Y'CrCb 4:2:2 or 4:2:0.

A coding unit can be divided into intra or inter coding units. An intra coding unit is a coding unit for which one or more intra prediction modes is used, whereas an inter coding unit is a coding unit for which one or more inter prediction modes is used.

Correspondingly, a prediction unit (PU) is a prediction block of luma samples and two corresponding prediction blocks of chroma samples of a picture, or a prediction block of a monochrome picture of a picture that is coded using three separate color planes. A prediction block (PB) is an M×N block of samples on which the same prediction is applied, such as an M×N block of luma samples or an M×N block of chroma samples.

This means that each PU has a specific prediction mode, i.e. an intra prediction mode or an inter prediction mode. Intra prediction modes typically involve a so-called intra planar mode, an intra DC mode and multiple intra angular modes defining different prediction directions. Inter prediction modes typically involve the so-called 2N×2N, 2N×N, N×2N, 2N×nU, 2N×nD, nL×2N, nR×2N and N×N modes.

A transform unit (TU) is a transform block of luma samples or four transform blocks of luma samples and two corresponding transform blocks of chroma samples of a picture, or a transform block of luma sample or four transform blocks of luma samples of a monochrome picture or a picture that is coded using three separate color planes. A transform block (TB) is an M×N block of samples on which the same transform is applied, such as an M×N block of luma samples or a M×N block of chroma samples.

In the art, a syntax element or codeword log 2_min_transform_blocksize_minus2 is used to specify the minimum transform block size for a video stream of pictures. This means that the variable Log 2MinTrafoSize representing the minimum transform block size is preferably equal to log 2_min_transform_block_size_minus2+2. Another syntax element or codeword log 2_diff_max_min_transform_block_size specifies the difference between a maximum transform block size and the minimum transform block size. This means that the variable Log 2MaxTrafoSize representing the maximum transform block size for the video stream is preferably equal to log 2_min_transform_block_size_minus2+2+log 2_diff_max_min_transform_block size. The maximum transform size, i.e. the maximum transform block size, in HEVC is 32×32 pixels or samples corresponding to a value of Log 2MaxTrafoSize equal to 5. The syntax elements log 2_min_transform_block_size_minus2 and log 2_diff_max_min_transform_block size are typically defined in a sequence parameter set (SPS) and thereby applies to a whole sequence of pictures in the video stream referring to this SPS.

According to an aspect a method in an encoder for restricting the use of large transforms is disclosed.

FIG. 1 is a flow diagram illustrating a method performed by an encoder according to an embodiment. The method comprises the encoder encoding, in step S1, at least one slice in at least one picture of a video stream by using a smaller maximum transform size for intra coding units (CU) in an inter coded slice (P/B slice) as compared to intra coding units (CU) in an intra coded slice (I slice) and/or inter coding units (CU).

Thus, the encoder thereby allows larger maximum transform size for inter coding units, which are only present in inter coded slices, i.e. P and B slices, and/or for intra coding units in intra coded slices as compared to the maximum transform size for intra coding units in inter coded slices. For instance, assume that the maximum transform size for an inter coding unit and/or an intra coding unit in an intra coded slice as used by the encoder is $N_1 \times N_1$ pixels or samples then the encoder restricts the maximum transform size for intra coding units in an inter coded slice to be $N_2 \times N_2$ pixels or samples, wherein $N_2 < N_1$. This means that the transform units for intra coding units in the inter coded slice of the coded video stream will have a size equal to or smaller than $N_2 \times N_2$ pixels, whereas the transform units for inter coding units and/or intra coding units in an intra coded slice in the coded video stream may have a size equal to or smaller than $N_1 \times N_1$ pixels.

As will be further described herein, the restriction in maximum transform size for intra coding units in inter coded slices as compared to intra coding units in intra coded slices and inter coding units in inter coded slices can be applied to at least one slice in at least one picture of the video stream. The restriction can, for instance, apply to all slices of the at least one picture of the video stream. The restriction can, for example, apply to all slices of a sequence of multiple, i.e. at least two, pictures of video stream. It is also possible that the restriction is applied to all pictures of the video stream and thereby to all slices in these pictures of the video stream.

In this latter case, the method as shown in FIG. 1 comprises the encoder encoding, in step S1, slices in pictures of a video stream by using a smaller maximum transform size for intra coding units in inter coded slices as compared to intra coding units in intra coded slices and/or inter coding units.

In an implementation embodiment of FIG. 1, the encoder preferably encodes the at least one slice by using a smaller maximum transform size for the intra coding units in the inter coded slice as compared to the inter coding units (in the inter coded slice). This means that any intra coding units in such an inter coded slice will have a maximum transform size that is smaller than any inter coding units in the inter coded slice.

The maximum transform size of intra coding units in an intra coded slice could, in this implementation embodiment, be larger than the maximum transform size of the intra coding units in the inter coded slice, such as equal to the maximum transform size of the inter coding units. Alternatively, the maximum transform size of intra coding units in the intra coded slice could be equal to the maximum transform size of the intra coding units in the inter coded slice. In this later case, the same maximum transform size is used for intra coding units regardless of whether they are present in an inter coded slice or an intra coded slice. This same maximum transform size is, however, smaller than the corresponding maximum transform size available for inter coding units in the inter coded slice.

In another implementation embodiment of FIG. 1, the encoder preferably encodes the at least one slice by using a smaller maximum transform size for the intra coding units in the inter coded slice as compared to the intra coding units in the intra coded slice. This means that the maximum transform size available for an intra coding unit is dependent on whether the intra coding unit is present in an inter coded slice or in an intra coded slice.

The maximum transform size of inter coding units in the inter coded slice could, in this implementation embodiment, be larger than the maximum transform size of the intra coding units in the inter coded slice, such as equal to the maximum transform size of the intra coding units in the intra coded slice. Alternatively, the maximum transform size of inter coding units could be equal to the maximum transform size of the intra coding units in the inter coded slice.

FIG. 2 is a flow diagram of a further implementation embodiment of FIG. 1 basically combining the two variants described above. In this implementation embodiment, the encoder encodes, in step S10, the at least one slice by using a smaller maximum transform size for intra coding units (CU) in the inter coded slice (P/B slice) as compared to intra coding units (CU) in the intra coded slice (I slice) and inter coding units (CU).

The maximum transform size of intra coding units in the inter coded slice is, in this implementation embodiment, smaller than the respective maximum transform size of both intra coding units in the intra coded slice and inter coding units. The maximum transform sizes of the latter two, i.e. the intra coding units in the intra coded slice and the inter coding units, are preferably the same but may be different as long as they are larger than the maximum transform size of intra coding units in the inter coded slice.

FIG. 3 is an implementation example of the method as shown in FIG. 1. The method comprises the encoder encoding, in step S20, an inter slice (P/B slice) in the at least one picture by using a maximum transform size of 16×16 pixels (or samples) for the intra coding units (CU) in the inter slice (P/B slice). Step S21 correspondingly comprises the encoder encoding a slice in the at least one picture by using a maximum transform size of 32×32 pixels (or samples) for the intra coding units (CU) in an intra slice (I slice) and/or the inter coding units (CU), preferably for the intra coding units in the intra slice and the inter coding units.

Step S20 is, thus, performed when the encoder encodes an inter slice, i.e. P or B slice, of pictures in the video stream and in particular encoding intra coding units in such an inter slice. Step S21 is performed by the encoder when encoding an intra slice and encoding inter coding units in an inter slice.

Thus, this embodiment restricts the use of large transforms, for example 32×32 transforms, for intra coding units in inter coded slices, in for instance HEVC, to a smaller transform size of, in this implementation example, 16×16. Maximum transform size for intra coding units in intra coded slices and for inter coding units can be kept at 32×32 transform size to maintain the coding efficiency of large transforms.

In this implementation example, transform units for intra coding units in inter coded slices could have a size of 8×8 or 16×16 and optionally 4×4. Correspondingly, transform units for intra coding unit in intra coded slices and inter coding units could have size of 8×8, 16×16 or 32×32 and optionally 4×4.

Hence, maximum transform size implies that a transform unit in a coding unit cannot have larger size than the maximum transform size but may have a smaller size.

The above presented examples of maximum transform sizes, i.e. 16×16 and 32×32, should merely be seen as illustrative, but preferred, examples. Other embodiments include using a maximum transform size of 8×8 in step S20 and using a maximum transform size of 32×32 in step S21, or a maximum transform size of 8×8 in step S20 and using a maximum transform size of 16×16 in step S21. The actual values of the maximum transform sizes are not limiting to the embodiments as long as the maximum transform size used in step S20 is smaller than the maximum transform size used in step S21.

FIG. 4 is a flow diagram illustrating another implementation example of the method as shown in FIG. 1. The method comprises the encoder generating, in step S30, a coded bitstream, also referred to as coded video sequence or stream (CVS), with encoded representation of the at least one slice. In this step S30, the encoder generates the encoded representation or representations so that intra coding units (CU) of an encoded representation of an inter slice (P/B slice) are restricted to have a smaller maximum transform size as compared to intra coding units (CU) of an encoded representation of an intra slices (I slice) and/or inter coding units (CU) of the encoded representation of the inter slice (P/B slice), preferably as compared to intra coding units of the encoded representation of the intra slice and inter coding units of the encoded representation of the inter slice.

Hence, in an embodiment the coded bitstream is generated in step S30 by using different maximum transform sizes depending on whether the coding units are intra coding units in inter coded slices or not.

Encoding slices 9 in pictures 8 of a video stream 7, see FIG. 27, is performed by generating a coded bitstream based on the original pixel values, i.e. color values, such as luminance+chrominance values, of the pixels in the pictures 8 of the video stream 7.

Thus, a picture 8 of the video stream 7 is organized into one or multiple slices 9, each of which could be an I slice, a P slice or a B slice. A slice 9 is then divided into coding units, each of which may be hierarchically split in a quad-tree structure ranging from a LCU and possible down to a SCU. FIG. 25 schematically illustrates a portion of a slice in an intra coded picture. In this example, the shown portion of the slice is divided into four LCUs, of which the first LCU is split into four smaller CUs. Each of the seven CUs shown in FIG. 25 is encoded using an intra coding and prediction mode since the slice is a so-called I slice. FIG. 26 schematically illustrates a portion of a slice in an inter coded picture. In this case, at least some of the CUs could be encoded using an inter coding and prediction mode (denoted P in the figure), whereas other CUs may be encoded using an intra coding and prediction mode (denoted I in the figure).

An inter coded CU may be split into one or multiple PUs, where each such PU has an inter prediction mode. Such a PU is typically encoded in a motion estimation procedure involving predicting the PU from a reference area in a reference picture of the video stream or from two reference areas in two reference pictures of the video stream. The one or two reference areas are found in a so-called motion estimation process that outputs one or two motion vectors and optionally one or two reference picture indices allowing identification of the one or two reference areas. A residual is then calculated between the PU and the reference area or a combination of the two reference areas. This residual represents a difference in pixel or sample values between the PU and the reference area or the combination of the two reference areas.

A TU is the basic unit for the transform and quantization processes. Hence, an inter coded CU is also split into one or multiple TUs. The same transform is applied to the portion of the inter coded CU encompassed by the TU. Accordingly, the residual is transformed and quantized and is then coded, such as by an entropy encoder, to generate a coded representation of the inter coded CU. Preferably also the motion vector(s) from the motion estimation is(are) encoded and forming part of the coded representation of the inter coded CU.

An intra coded CU may also be split into one or multiple PUs and into one or multiple TUs. Each such PU has an intra prediction mode, which could be a planar or DC mode or one of the available prediction directions. In the latter case, a reference area within the current slice is used prediction for the current PU and a residual is calculated as discussed above. This residual is then transformed, quantized and encoded.

Thus, the embodiments can effectively reduce the amount of visible blocking artifacts in HEVC and keep coding efficiency by having a separate maximum transform size for intra coding units in inter coded slices and other intra coding units (in intra slices) and/or inter coding units (in P and B slices).

The restriction can be implemented in various ways as is further exemplified below.

An approach is to specify in the bitstream information of the restriction such as the maximum size of the transform for intra coding units in inter coding slices. Examples include in a sequence parameter set (SPS), implying the same restriction for the whole sequence, in a picture parameter set (PPS), implying the same restriction for the whole picture, or in a slice header, implying the same restriction for the whole slice.

Syntax Example in SPS:
log 2_diff_max_min_transform_block size_intra ue(v)
Semantics Example:
log 2_diff_max_min_transform_block_size_intra specifies the difference between the maximum and minimum transform block size for an intra transform block in P or B slices.

log 2_diff_max_min_transform_block_size specifies the difference between the maximum and minimum transform block size.

For intra prediction mode when slice_type is equal to I or inter predictions modes the variable Log 2MaxTrafoSize is set equal to log 2_min_transform_block_size_minus2+2+ log 2_diff_max_min_transform_block_size. Otherwise the variable Log 2MaxTrafoSize is set equal to log 2_min_transform_block_size_minus2+2+log 2_diff_max_min_transform_block_size_intra.

FIG. 5 is a flow diagram illustrating additional, optional steps of the method shown in FIG. 1 according to this approach. The method then continues from step S1 in FIG. 1. The following step S40 comprises the encoder specifying (first) information, preferably represented by the syntax element log 2_diff_max_min_transform_block size, representing a difference between a maximum and a minimum transform block size for the intra coding units in the intra coded slice and/or the inter coding units, preferably for the intra coding units in the intra coded slice and the inter coding units. Step S41 correspondingly comprises the encoder specifying (second) information, preferably represented by the syntax element log 2_diff_max_min_transform_block_ size_intra, representing a difference between a maximum and a minimum transform block size for the intra coding units in the inter coded slice. The encoder then includes, in step S42, the (first and second) information, i.e. log 2_diff_ max_min_transform_block_size and log 2_diff_max_min_ transform_blocksize_intra, in a coded bitstream with encoded representation of the at least one slice. According to the embodiments, log 2_diff_max_min_transform_block_ size has or represents a value different from log 2_diff_max_ min_transform_block_size_intra and preferably log 2_diff_max_min_transform_block_size>log 2_diff_max min_transform_block_size_intra.

Hence, this embodiment uses two different syntax elements, i.e. log 2_diff_max_min_transform_block_size and log 2_diff_max_min_transform_block_size_intra, to enable restriction in maximum transform size for intra coding units in inter coded slices.

Generally, when an encoder encodes slices in pictures of a video stream the encoder divides a picture into one or multiple, i.e. at least two, slices. A slice is typically an independently encodable and decodable portion of the picture. The encoder encodes the slice to get a slice header and encoded slice data, i.e. video payload, together forming an encoded representation of the slice. This encoded representation is typically output from the encoding process as a so called Network Adaptation Layer (NAL) unit. A NAL unit may, alternatively, carry parameter set data providing control data applicable to all slices of a picture, to all pictures within a sequence or indeed to a complete video sequence. Examples of such parameter sets include Picture Parameter Set (PPS), Sequence Parameter Set (SPS) and Video Parameter Set (VPS). In such a case, the slice header comprises information allowing identification of the parameter set that is associated with the slice and comprises control data applicable to the slice. For instance, a slice header can comprise a PPS identifier identifying a PPS. The PPS may in turn comprise an SPS identifier allowing identification of an SPS, which may comprise a VPS identifier identifying a VPS.

Step S42 can be performed according to various embodiments. In a first embodiment, the encoder includes the information in a parameter set in the coded bitstream, such as in a PPS, an SPS or a VPS, preferably in an SPS. The encoder then includes a parameter set identifier, allowing (direct—PPS, or indirect—SPS, VPS) identification of the relevant parameter set, in the slice header of an encoded representation of the slice. Alternatively, step S42 comprises the encoder inserting or including the information directly in the slice header.

The inclusion of the information in the coded bitstream in step S42 affects whether the restriction applies to the whole video stream, such as including the information in a VPS, to a sequence of pictures of the video stream, such as including the information in an SPS, to all slices in a picture of the video stream, such as including the information in a PPS, or to a slice in a picture of the video stream, such as including the information in a slice header.

It is therefore possible for the encoder to apply the restriction of the maximum transform size to only some slices or pictures of the video stream, whereas other slices or pictures may use the same maximum transform size for all coding units, i.e. the same maximum transform size for intra coding units in inter coded slices, intra coding units in intra coded slices and inter coding units in inter coded slices.

In such a case, the encoder can limit the restriction of the maximum transform size to those pictures or slices where the restriction will have the most effect, i.e. for those pictures or slices where visual artifacts otherwise can be seen, such as for content like water, fire, smoke, etc. However, experimental results as indicated herein show that the restriction of the maximum transform size does not impair the quality of the video stream for "normal" video content, i.e. video content different from water, fire, smoke, etc. Hence, the restriction of the maximum transform size can be applied to all slices and pictures of a video stream without any negative effects with regard to quality for pictures of "normal" video content but positive effects with regard to quality for "difficult" sequences, such as the sequences that contain water, rain, fire, etc.

Another approach is to make a restriction in the encoder so that maximum transform size for intra coding units in inter coded slices is 16×16 or smaller.

```
#define ENCODER_INTER_SLICE_INTRA_TU_LOG2_MAXSIZE 16
Void
TEncSearch::xRecurIntraCodingQT (TComDataCU*         pcCU,
                                 UInt                uiTrDepth,
                                 UInt                uiAbsPartIdx,
                                 Bool                bLumaOnly,
                                 TComYuv*            pcOrgYuv,
                                 TComYuv*            pcPredYuv,
                                 TComYuv*            pcResiYuv,
                                 UInt&               ruiDistY,
                                 UInt&               ruiDistC,
#if HHI_RQT_INTRA_SPEEDUP
                                 Bool                bCheckFirst,
#endif
                                 Double&             dRDCost )
{
    UInt              uiFullDepth = pcCU->getDepth( 0 ) + uiTrDepth;
    UInt              uiLog2TrSize = g_aucConvertToBit[ pcCU->getSlice( )->getSPS( )->getMaxCUWidth( ) >>
uiFullDepth ] + 2;
    Int               tuSize = pcCU->getSlice( )->getSPS( )->getQuadtreeTULog2MaxSize( );
    Int               isIntraSlice = (pcCU->getSlice( )->getSliceType( ) == I_SLICE);
    Bool              bCheckFull;
    if(isIntraSlice)
        bCheckFull = ( uiLog2TrSize <= pcCU->getSlice( )->getSPS( )->getQuadtreeTULog2MaxSize( ) );
    else
        bCheckFull = ( uiLog2TrSize <=
min(tuSize,ENCODER_INTER_SLICE_INTRA_TU_LOG2_MAXSIZE) );
```

FIG. 6 is a flow diagram illustrating an embodiment of the method in FIG. 1 according to this approach. Step S50 of FIG. 6 comprises the encoder restricting a search space with regard to transform size up to 16×16 pixels when selecting an intra coding unit (CU) in an inter coded slice (P/B slice) that results in a lowest rate-distortion cost of multiple candidate intra coding units. Step S51 correspondingly comprises the encoder allowing a search space with regard to transform size up to 32×32 pixels when selecting an intra coding unit (CU) in an intra coded slice (I slice) or an inter coding unit (CU) that results in a lowest-rate distortion cost of multiple candidate intra coding units or multiple candidate inter coding units.

The encoding process typically involves the encoder testing various candidate parameters and then selecting the set of such candidate parameters that results in the lowest rate-distortion cost. For instance, a slice can be encoded by testing various candidate hierarchical quad-tree structures, testing various PU partitions and testing various TU partitions. The alternatives of TU partitions, i.e. dividing each CU into one or multiple TUs, constitute a search space with regard to transform size. This means that the search space available in step S51 with regard to transform size is generally larger than the search space available in step S50 since a TU size of 32×32 pixels can be used in step S51 but not in step S50.

In a particular embodiment, the search space available in step S50 with regard to transform size consists of TU sizes of 16×16 and 8×8 pixels and optionally also of 4×4 pixels. The corresponding search space available in step S51 with regard to transform size consists of TU sizes of 32×32, 16×16 and 8×8 pixels and optionally also of 4×4 pixels.

A further approach is to specify in the video standard that intra coding CUs in inter coded slices shall not use larger than, for instance, 16×16 transforms. For example, log 2_diff_max_min_transform_block_size specifies the difference between the maximum and minimum transform block size.

For intra prediction mode when slice_type is equal to I or inter predictions modes the variable Log 2MaxTrafoSize is set equal to log 2_min_transform_block_size_minus2+2+ log 2_diff_max_min_transform_block size.

Otherwise the variable Log 2MaxTrafoSize is set equal to log 2_min_transform_block_size_minus2+2+min(log 2_diff_max_min_transform_block_size,2).

The bitstream shall not contain data that result in Log 2MaxTrafoSize greater than min(Log 2CtbSizeY, 5).

FIG. 7 is a flow diagram illustrating an implementation of this approach. Step S60 comprises the encoder encoding an inter slice (P/B slice) in the at least one picture by restricting a maximum transform size, preferably represented by a variable Log 2MaxTrafoSize, for intra coding units (CU) in the inter slice (P/B slice) to be equal to log 2_min_transform_block_size_minus2+2+min(log 2_diff_max_min_transform_block_size,2). Step S61 correspondingly comprises the encoder encoding a slice in the at least one picture by using a maximum transform size, preferably represented by a variable Log 2MaxTrafoSize, for intra coding units (CU) in an intra slice (I slice) and/or inter coding units (CU), preferably for intra coding units in the intra coded slice and inter coding units, to be equal to log 2_min_transform_block size_minus2+2+log 2_diff_max_min_transform_block size. In this embodiment, log 2_min_transform_block_size_minus2 represents a minimum transform block size and log 2_diff_max_min_transform_block_size specifies a difference between the minimum transform block size and a maximum transform block size.

The function min(a, b) outputs a if a<b and otherwise outputs b.

This means that this embodiment restricts the value of the maximum transform size by replacing the syntax element log 2_diff_max_min_transform_block_size by 2 if log 2_diff_max_min_transform_block_size>2 for intra coding units in inter coded slices. Hence, the maximum transform size for such intra coding units in inter coded slices can be log 2_min_transform_block_size_minus2+2+0, log 2_min_transform_block_size_minus2+2+1 or log 2_min_transform_block_size_minus2+2+2 but not larger.

In an alternative embodiment, another predefined value than 2 is used together with the log 2_diff_max_min_transform_block_size in the function min( ) above. For instance, step S60 could comprise the encoder encoding an inter slice in a picture of the video stream by restricting a maximum transform size, preferably represented by a variable Log 2MaxTrafoSize, for intra coding units in the inter slice to be equal to log 2_min_transform_block_size_minus2+2+min (log 2_diff_max_min_transform_block_size, 1) or to be equal to log 2_min_transform_block_size_minus2+2+min (log 2_diff_max_min_transform_block_size, 0).

In an optional embodiment, the method as shown in FIG. 7 additionally comprises the encoder generating a coded bitstream with encoded representation of the at least one slice that does not contain data that result in Log 2MaxTrafoSize greater than min(Log 2CtbSizeY, 5), wherein Log 2CtbSizeY, also referred to as CtbLog 2SizeY, represents a width and height of a coding tree block.

In the above described embodiments the encoder is restricted to use a smaller maximum transform size for intra coding units in inter coded slices as compared to inter coding units and/or intra coding units in intra coded slices.

An alternative approach is to use a so-called soft restriction, e.g. to allow the use of large transforms (and prediction units) for intra coded CUs in P or B slices but penalize the use of them in the encoder coding mode selection. Thus, the encoder is in this approach configured to restrict use of large transforms by penalizing the use of large transforms.

FIG. 8 is a flow diagram illustrating an embodiment of such an approach. The method of FIG. 8 is performed by an encoder and comprises the encoder penalizing, in step S70, usage of a large transform size for intra coding units (CU) in an inter coded slice (P/B slice) in at least one picture of a video stream as compared to intra coding units (CU) in an intra coded slice (I slice) and/or inter coding units (CU) when calculating a rate-distortion cost for encoding a slice according to different encoding modes.

Rate-distortion optimization is a general tool of improving quality in video coding. The optimization involves making a trade-off between the amount of distortion, i.e. loss of video quality, and the amount of data required to encode the video. The rate-distortion cost (J) is a measure representing a combination of the distortion (D) and the amount of data (R) required to encode the video: $J=D+\lambda \times R$, wherein $\lambda$ is the Lagrange multiplier also referred to as parameter lambda in the art. When encoding a slice of a picture in a video stream, the encoder typically selects a candidate encoded version of the slice that minimizes the rate-distortion cost and uses this selected candidate encoded version as the encoded representation of the slice.

The different candidate encoded versions are obtained by encoding the slice according to different encoding modes, for instance, intra coding vs. inter coding; different hierarchical quad-tree structures, i.e. different coding unit splits; different intra or inter prediction modes; different transform unit sizes; etc. The encoder can then perform an exhaustive search within the search space comprising all possible candidate encoded versions or use some constraints that limit the search space to contain fewer candidate encoded versions. In either case, the encoder preferably calculates a respective rate-distortion cost for each tested candidate encoded version and then selects the one that minimizes the rate-distortion cost.

As a consequence, by penalizing usage of a large transform size for intra coding units in inter coded slices in step S70 of FIG. 8 the rate-distortion cost of candidate encoded versions of an inter coded slice using such large transform size for intra coding units in the inter coded slice will be higher and such candidate encoded versions are less likely to be selected by the encoder as compared to if no penalty would be used.

In an embodiment, the method of FIG. 8 comprises the encoder penalizing, in step S70, usage of a large transform size for intra coding units in inter coded slices in pictures of the video stream as compared to intra coding units in intra coded slices in pictures of the video stream and/or inter coding units in pictures of the video stream when calculating a rate-distortion cost for encoding slices in pictures of the video stream according to different encoding modes.

In an implementation embodiment of FIG. 8, the encoder preferably penalizes usage of the large transform size for the intra coding units in the inter coded slice as compared to the inter coding units (in the inter coded slice) when calculating the rate-distortion cost for encoding the slice according to different encoding modes.

In this implementation embodiment, there will be penalty for intra coding units in the inter coded slice as compared to inter coding units in the inter coded slice with regard to using a large transform size. Accordingly, the encoder is configured to be less likely to select the large transform size for intra coding units in inter coded slices as compared to selecting smaller transform sizes for the intra coding units and/or selecting the large transform size but then using inter coding units in the inter coded slices.

In another implementation embodiment of FIG. 8, the encoder preferably penalizes usage of the large transform size for the intra coding units in the inter coded slice as compared to the intra coding units in the intra coded slice when calculating the rate-distortion cost for encoding the slice according to different encoding modes.

In this implementation embodiment, there will be penalty for intra coding units in the inter coded slice as compared to intra coding units in the intra coded slice with regard to using a large transform size. Accordingly, the encoder is configured to be less likely to select the large transform size for intra coding units in inter coded slices as compared to selecting smaller transform sizes for the intra coding units and/or selecting the large transform size but then using intra coding units in intra coded slices.

FIG. 9 is a flow diagram illustrating a further implementation embodiment of the method shown in FIG. 8. In this implementation embodiment, the encoder penalizes, in step S80, usage of the large transform size for the intra coding units (CU) in the inter coded slice (P/B slice) as compared to the intra coding units (CU) in the intra coded slice (I slice) and the inter coding units (CU) when calculating the rate-distortion cost for encoding the slice according to different encoding modes.

One way to implement the penalty is to decrease lambda, i.e. the Lagrange multiplier, used in the rate-distortion (RD) cost calculations when encoding intra coding units in P or B slices, i.e. inter coded slices. This will make it favorable to select smaller transforms, which typically cost more bits to encode (and/or spend more bits on coding).

FIG. 10 is a flow diagram of the method in FIG. 8 according to the above described embodiment. The embodiment comprises the encoder calculating, in step S90, the rate-distortion (RD) cost by using a lower lambda ($\lambda$) for the intra coding units (CU) in the inter coded slice (P/B slice) as compared to the intra coding units (CU) in the intra coded slice (I slice) and/or the inter coding units (CU).

Another way to implement such a penalty is to scale the distortion by a scaling factor larger than one when large transforms (or prediction units) are used. That makes it more likely that smaller transform sizes (and/or prediction unit sizes) are chosen, unless the larger transforms (and prediction units) result in significantly lower distortion.

FIG. 11 is a flow diagram of the method in FIG. 8 according to the above described embodiment. The embodiment comprises the encoder calculating, in step S100, the rate-distortion (RD) cost by using a scaling factor (SF) for distortion of one for the large transform size for the intra coding units (CU) in the intra coded slice (I slice) and/or the inter coding units (CU). Step S101 correspondingly comprises the encoder calculating the rate-distortion (RD) cost by using a scaling factor (SF) for distortion larger than one for the large transform size for the intra coding units (CU) in the inter coded slice (P/B slice).

As a consequence, when calculating the rate-distortion cost in step S100 an equation for the rate-distortion cost of $J=1\times D+\lambda\times R=D+\lambda\times R$ could be used. The corresponding equation as used in step S101 is instead $J=SF\times D+\lambda\times D$, wherein $SF>1$. In a more general approach step S100 could involve using the following equation $J=SF_1\times D+\lambda\times R$ when calculating the rate-distortion cost whereas step S101 uses the equation $J=SF_2\times D+\lambda\times R$, wherein $SF_2>SF_1$.

Instead of scaling the distortion for large transforms and/or prediction units, penalty can be added to the distortion value for those blocks. The distortion is defined as a sum of the absolute or squared pixel differences between the original pixel values and the reconstructed pixel values (possibly divided by the number of samples used in calculating the distortion). Typically the encoding modes are determined based on rate-distortion cost (RD cost). RD cost is defined as lambda×bits+distortion (or lambda×rate+distortion). The encoding mode with the lowest RD cost is typically selected. Sometimes, to speed up the mode selection, the encoder performs the mode selection only based on the distortion.

FIG. 12 is a flow diagram of the method in FIG. 8 according to the above described embodiment. The method comprises the encoder calculating, in step S110, the rate-distortion (RD) cost by adding a penalty value to a distortion value for the large transform size for the intra coding units (CU) in the inter coded slice (P/B slice).

This means that according to the embodiment as shown in FIG. 12 the distortion value for the large transform size for the intra coding units in the inter coded slice is preferably equal to D+P. D represents the distortion value, which is preferably obtained as a sum of absolute or squared pixel or sample differences between the original pixel or sample values and reconstructed pixel or sample values, optionally divided by the number of samples used in calculating the distortion. The reconstructed pixel or sample values are obtained, which is well known in the art, by encoding the original pixel or sample values and then decoding the obtained encoded pixel or sample values. P represents the penalty value added to the distortion value. In a preferred embodiment, such a penalty value (P) is only added to the distortion for intra coding units in inter coded slices and is therefore preferably not added for intra coding units in intra coded slices or for inter coding units in inter coded slices.

One preferred method is to add the penalty for large transforms on intra block in inter slices as disclosed herein.

The large transform size mentioned in the foregoing in connection with the embodiments as shown in FIGS. 8 to 12 is preferably a transform size of 32×32 pixels or samples. This means then that the embodiment as shown in FIG. 8 comprises the encoder penalizing usage of a transform size of 32×32 for the intra coding units in inter coded slices in the pictures of the video stream as compared to the intra coding units in intra coded slices and/or the inter coding units when calculating the rate-distortion cost for encoding slices according to different encoding modes.

If the large transform size is 32×32 pixels as mentioned above, then preferably no penalty is used for transform sizes smaller than 32×32 pixels for the intra coding units in inter coded slices. Alternatively, different levels of penalty could be used depending on the transform sizes for the intra coding units in inter coded slices. For instance, a "high" penalty level is used for transform size 32×32, a "medium" penalty level is used for transform size 16×16 and a "low" or none penalty level is used for transform size 8×8 for the intra coding units in inter coded slices.

Preferably no penalty is used regardless of transform size, including transform size 32×32, for the intra coding units in intra coded slices and for the inter coding units.

Experiments

An observation from studying encoded sequences is that visible block artifacts are often associated with large intra-blocks (e.g. 32×32 blocks). When the motion is chaotic it is difficult to get good prediction from the previously decoded pictures. In such cases, intra-picture prediction is often chosen by the encoder.

The HEVC deblocking filtering can only modify three pixels from the block boundary. When the rate-distortion optimization chooses 32×32 intra-predicted CUs at higher depth, the prediction is often coarse and since the transform coefficients are also coarsely quantized, block artifacts can appear. It might be difficult to conceal a blocking artifact by just applying the deblocking filtering. Imagine 32×32 lighter and darker uniform blocks arranged in a checkerboard pattern. Even if the deblocking is applied to all block boundaries and transitions between the blocks are smooth, the block pattern would still be visible since there are only three pixels from each side of the block boundary that are modified while most samples in the block are not changed by deblocking.

To improve visual quality, the HEVC encoder can limit the maximum TU size to 16×16 samples for coding of intra CUs in inter-predicted slices by setting the configuration parameter RDpenalty to 2 in the reference software for the HEVC reference encoder [5]. This constraint will also restrict the maximum intra-predicted block size and may increase the bitrate from 0 to a couple of percent.

Alternatively, a penalty for using 32×32 intra-prediction blocks can be applied to the rate-distortion cost by setting the RDpenalty to 1. In our experiments, RDpenalty has been set equal to 2.

The subjective method Double Stimulus Continuous Quality Scale (DSCQS) variant I (one viewer at a time) [1] has been chosen for this subjective test since deblocking has more effects at medium and low video quality condition. This method is particularly useful when the test does not use full range of quality. Moreover, according to the research results, the DSCQS method is better than the other test methods in minimizing contextual effects for subjective quality assessment [1].

The test has been conducted with naïve viewers. It consisted of two sessions of 20 minutes each. A test subject was presented a series of video pairs in random order. The processed video sequences (PVS) were presented in pairs ("A" and "B") and every pair consisted of the same video sequence where one test video was processed with the anchor (reference) and the second video was processed with the method under assessment. The subjects were asked to assess the overall quality of each video in the pair using the respective voting scale without knowing which one was the reference video. The video sequences could have been viewed several times (maximum three times). Both playout and voting procedure was steered by test subjects who could initiate the voting when ready for it. A training session was held after the instructions and before the test execution to help test subjects to understand the test procedure and familiarize them with typical video quality conditions. The training session comprised six pairs of video sequences, different from those used in the test. The subjects scored the videos on a continuous quality assessment scale (maximum value: 100, minimum value: 0) based on five categories "Excellent", "Good", "Fair", "Poor" and "Bad".

Each test session involved only one subject per display assessing the test material. The subject was placed directly at the centre of the display at the 3H (three times of the display height) viewing distance. The ambient lighting system based on high frequency neon lamps with color temperature of 6500 K was used.

The test environment setup and display settings are summarized below:

Display: 40" Sony KDL-40×3500
Display settings: 50 Hz refresh rate, Brightness—48 (~200 cd/m² peak luminance), Contrast—90, Backlight—6, Sharpness—60, Noise Reduction—off.
The viewing distance was 3 times the display height.
The ambient light level measured at viewing position was ~25 lux.

In total, 38 naïve viewers, not working professionally with quality assessment or video processing participated in the test. All viewers were screened for normal visual acuity (20/30 for one eye and 20/25 for both eyes) using Snellen test with or without corrective glasses. All subjects had visual acuity 20/25 or higher.

In total, eight 1080p25 source video sequences with duration 10 seconds were used in the test. Three sequences were taken from the JCT-VC test set (Riverbed, ParkScene, Kimono) and five other sequences were prepared for the test (Fire, Fountain, Water1, Water6 and Underwater). All source sequences contained high amount of motion except ParkScene and Kimono. These two videos have been used to verify that the proposed methods do not impair the video quality compared to the anchor. ParkScene and Kimono sequences originated from 1080p24 source were played at 25 Hz frame rate to avoid impact of the playback jitter on the quality.

Both the anchor and proposed approach described were coded with HM-11.0 [2] in random access configuration.

The two-way ANOVA was applied to the raw difference scores to check the between-subject variability and that scores given by subjects were drawn from the same distribution (under the null hypothesis for between-subjects variation). The results of the ANOVA indicated that there was significant (p=0) subject-to-subject variability. Therefore the scores were also normalized according to offset mean correction rule [3], [4]. The results for both raw and normalized scores were analyzed. The two-way ANOVA applied after the mean offset correction showed that between-subject variation decreased (p=0.19>0.05).

Figure 28B:
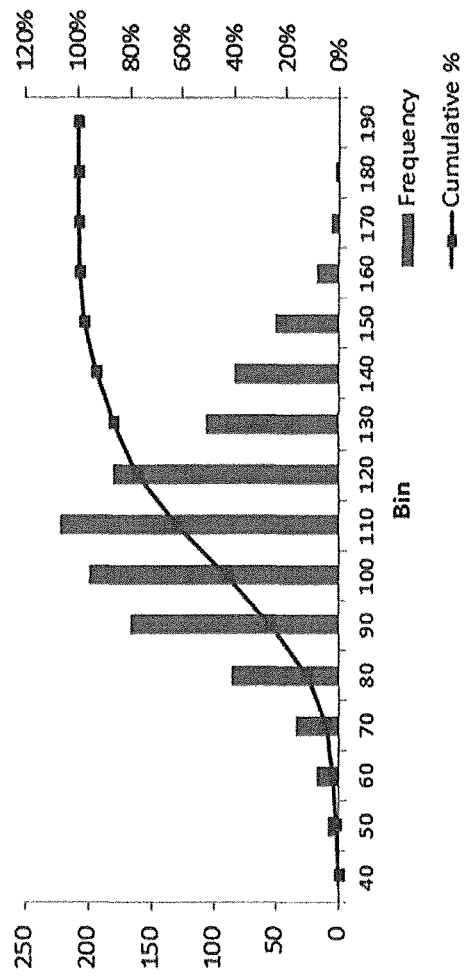

The screening of possible outlier subjects was performed on both data sets, according to the procedure described in [1]. Four of 38 subjects were detected and discarded from both the normalized and raw results. The results of the normalization procedure can be observed by comparing the histograms (see FIGS. 28A and 28B).

After the screening, the mean opinion scores were calculated for every PVS. The difference between the reference video score and the accessed video score was subtracted from the maximum value of the voting scale (100): 100−(ref score−assessment_score). Then the difference values were averaged across all the subjects to yield a difference mean opinion score (DMOS) for non-normalized and normalized subjective data (NDMOS).

Thus, DMOS and NDMOS scores below 100 correspond to cases when the test subject considered the reference video quality higher than the assessed video and above 100 when the assessed video (from the proposed method) was judged to have higher quality than the reference.

FIGS. 29A and 29B show test results per video sequence, both DMOS and normalized DMOS (NDMOS). One can see that the results for both DMOS and NDMOS are quite similar. All six difficult sequences were scored higher than the reference with non-overlapping confidence interval for the normalized scores and five out of these six sequences show non-overlapping confidence intervals with the reference for the raw scores. Once can also see that the two sequences used to check that the proposed method does not impair the normal sequences show very similar results to the reference.

Figure 30A:
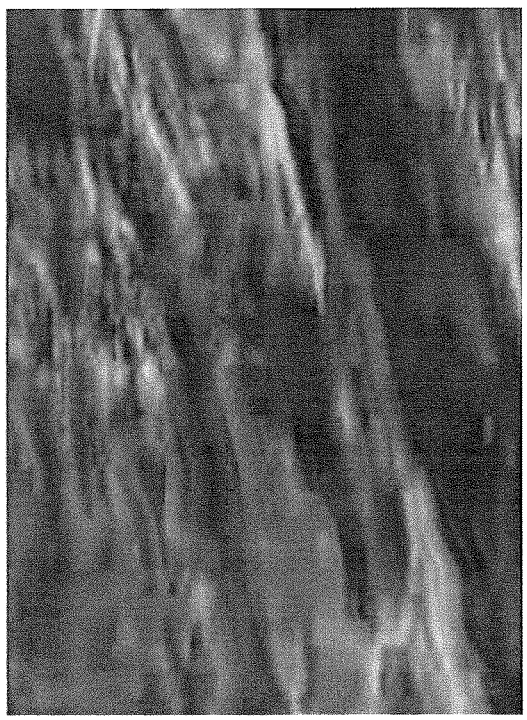
FIGS. 30A and 30B illustrate remaining block artifacts for sequence Riverbed, base QP 37, for an embodiment (FIG. 30A) and prior art (FIG. 30B).
Figure 30B:
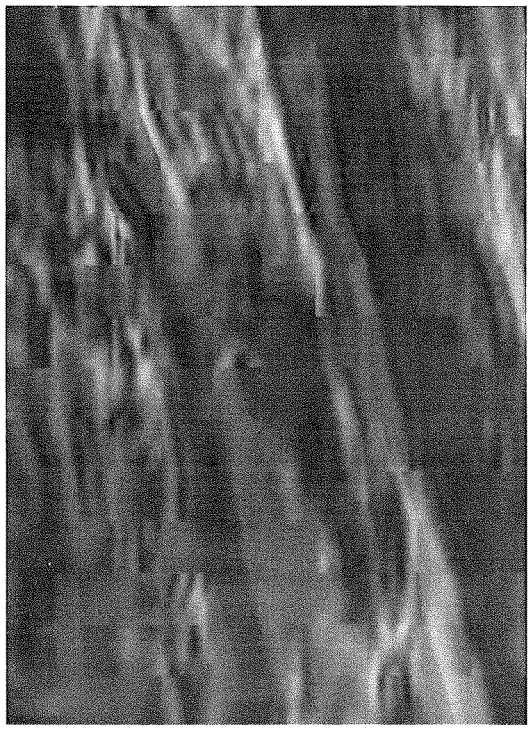

The bitrates of the sequences generated by the proposed method are shown in Table 1 below. One can see that the bitrates are on average similar to the bitrates of the anchor with the biggest difference of 4.9% on the Underwater sequence. The difference is caused by not choosing 32×32 intra-predicted blocks in reference frames. For the sequence Fire, however, the bitrate difference is below 1%, while this sequence exhibits the second biggest subjective quality difference between the tested method and the reference. FIG. 30A demonstrates how the proposed approach improves visual quality (compared with the reference shown in FIG. 30B).

TABLE 1

Bitrates of the proposed method compared to the anchor

| | Anchor | | HOffNoIntra32 | | |
|---|---|---|---|---|---|
| Video | QP* | [kbps] | QP* | [kbps] | % |
| Fountain | 37 | 6104.972 | 37 | 6157.793 | 100.9 |
| Fire | 37 | 2441.594 | 37 | 2462.629 | 100.9 |
| Riverbed | 37 | 2346.436 | 37 | 2440.269 | 104.0 |
| Park Scene | 37 | 717.301 | 37 | 718.150 | 100.1 |
| Underwater | 37 | 666.062 | 37 | 698.535 | 104.9 |
| Water6 | 37 | 616.439 | 37 | 628.155 | 101.9 |
| Kimono | 37 | 542.574 | 37 | 544.578 | 100.4 |
| Water1 | 32 | 541.010 | 32 | 559.620 | 103.4 |

*QP = quantization parameter

The obtained results indicate that the proposed method improves the subjective quality on difficult sequences, such as the sequences that contain water, rain, fire, etc. The proposed method does not impair the quality of the video sequences that have slow or linear motion, i.e. "normal" video content. The method offers a practical solution that improves the subjective quality significantly when encoding the sequences with chaotic motion with HEVC encoder.

Implementation Aspects

The steps, functions, procedures, modules and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described above may be implemented in software such as a computer program for execution by suitable processing circuitry including one or more processing units or processors.

The processor is capable of executing software instructions contained in a computer program stored in a computer program product e.g. in the form of the memories. The respective computer program product can be a memory being any combination of read and write memory (RAM) and read only memory (ROM). The respective memory comprises persistent storage, which, for example, can be any single one or combination of magnetic memory, optical memory, solid state memory or even remotely mounted memory.

The flow diagram or diagrams presented above, see FIGS. 1-12, may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect an encoder is configured to implement a restriction of the use of large transforms.

FIG. 13 is a schematic block diagram of an encoder 1 according to an embodiment. The encoder 1 is operable to encode at least one slice in at least one picture of a video stream by using a smaller maximum transform size for intra coding units in an inter coded slice as compared to intra coding units in an intra coded slice and/or inter coding units.

In an implementation embodiment of FIG. 13, the encoder 1 is operable to encode the at least one slice by using a smaller maximum transform size for the intra coding units in the inter coded slice as compared to the inter coding units.

In another implementation embodiment of FIG. 13, the encoder 1 is operable to encode the at least one slice by using a smaller maximum transform size for the intra coding units in the inter coded slice as compared to the intra coding units in the intra coded slice.

In a further implementation embodiment of FIG. 13, the encoder 1 is operable to encode the at least one slice by using a smaller maximum transform size for the intra coding units in the inter coded slice as compared to the intra coding units in the intra coded slice and the inter coding units.

In an implementation example, the encoder 80 comprises a processor 82 and a memory 84 connected to the processor 82, see FIG. 15. The processor 82 is then operable, or configured or adapted to encode at least one slice in at least one picture of a video stream by using a smaller maximum transform size for intra coding units in an inter coded slice as compared to intra coding units in an intra coded slice and/or inter coding units, preferably as compared to the intra coding units in the intra coded slice and the inter coding units.

In an embodiment, the processor 82 is operable to encode an inter slice in the at least one picture by using a maximum transform size of 16×16 pixels for the intra coding units in the inter slice. In this embodiment, the processor 82 is further operable to encode a slice in the at least one picture by using a maximum transform size of 32×32 pixels for the intra coding units in an intra slice and/or the inter coding units, preferably for the intra coding units in the intra slice and for the inter coding units.

In an alternative or complementary embodiment, the processor 82 is operable to generate a coded bitstream with encoded representation of the at least one slice. In such a case, intra coding units of an encoded representation of an inter slice are restricted to have a smaller maximum transform size as compared to intra coding units of an encoded representation of an intra slice and/or inter coding units of the encoded representation of the inter slice, preferably as compared to intra coding units of the encoded representation of the intra slice and inter coding units of the encoded representation of the inter slice.

In another alternative or complementary embodiment, the processor 82 is operable to specify information, preferably represented by the syntax element log 2_diff_max_min_transform_block_size, representing a difference between a maximum and a minimum transform block size for the intra coding units in the intra coded slice and/or the inter coding units. The processor 82 is also operable to specify information, preferably represented by the syntax element log 2_diff_max_min_transform_block size_intra, representing a difference between a maximum and a minimum transform block size for the intra coding units in the inter coded slice. The processor 82 is additionally operable to include the information, log 2_diff_max_min_transform_block size and log 2_diff_max_min_transform_block size_intra, in a coded bitstream with encoded representation of the at least one slice. In this embodiment, log 2_diff_max_min_transform_block_size has a value different from log 2_diff_max_min_transform_block_size_intra, preferably larger than log 2_diff_max_min_transform_block size_intra.

In an embodiment, the processor 82 is operable to include the information in a parameter set, such as a PPS, an SPS or a VPS, preferably an SPS, of or associated with the coded bitstream. Alternatively, or in addition, the processor 82 could include the information in slice headers of NAL units in the coded bitstream.

In a further alternative or complementary embodiment, the processor 82 is operable to restrict a search space with regard to transform size to 16×16 pixels when selecting an intra coding unit in an inter coded slice that results in a lowest rate-distortion cost of multiple candidate intra coding units. The processor 82 is also operable to allow a search space with regard to transform size up to 32×32 pixels when selecting an intra coding unit in an intra coded slice or an inter coding unit that results in a lowest rate-distortion cost of multiple candidate intra coding units or multiple candidate inter coding units.

In yet another alternative or complementary embodiment, the processor 82 is operable to encode an inter slice in the at least one picture by restricting a maximum transform size, preferably as represented by the variable Log 2MaxTrafoSize, for the intra coding units in the inter slice to be equal to log 2_min_transform_block_size_minus2+2+min(log 2_diff_max_min_transform_block_size, 2). The processor

82 is also operable to encode a slice in the at least one picture by using a maximum transform size, preferably as represented by the variable Log 2MaxTrafoSize, for the intra coding units in an intra slice and/or the inter coding units to be equal to log 2_min_transform_block_size_minus2+2+ log 2_diff_max_min_transform_block_size. In a preferred embodiment, the processor 82 is operable to use Log 2Max-TrafoSize equal to log 2_min_transform_block_size_minus2+2+log 2_diff_max_min_transform_block size for the intra coding units in the intra slice and the inter coding units. In this embodiment, log 2_min_transform_block_size_minus2 represents a minimum transform block size and log 2_diff_max_min_transform_block_size specifies a difference between the minimum transform block size and a maximum transform block size.

In another embodiment, the encoder 1 of FIG. 13 is operable to penalize usage of a large transform size for intra coding units in an inter coded slice in at least one picture of a video stream as compared to intra coding units in an intra coded slices and/or inter coding units when calculating a rate-distortion cost for encoding a slice according to different encoding modes.

In an implementation embodiment of FIG. 13, the encoder 1 is operable to penalize usage of the large transform size for the intra coding units in the inter coded slice as compared to the inter coding units when calculating the rate-distortion cost for encoding the slice according to different encoding modes.

In another implementation embodiment of FIG. 13, the encoder 1 is operable to penalize usage of the large transform size for the intra coding units in the inter coded slice as compared to the intra coding units in the intra coded slice when calculating the rate-distortion cost for encoding the slice according to different encoding modes.

In a further implementation embodiment of FIG. 13, the encoder 1 is operable to penalize usage of the large transform size for the intra coding units in the inter coded slice as compared to the intra coding units in the intra coded slice and the inter coding units when calculating the rate-distortion cost for encoding the slice according to different encoding modes.

In an implementation example, the encoder 80 comprises a processor 82 and a memory 84 connected to the processor 82, see FIG. 15. The processor 82 is then operable, or configured or adapted to penalize usage of the large transform size for intra coding units in an inter coded slice in at least one picture of a video stream as compared to intra coding units in an intra coded slice and/or the inter coding units when calculating the rate-distortion cost for encoding a slice according to different encoding modes.

In an embodiment, the processor 82 is operable to calculate the rate-distortion cost by using a lower lambda for the intra coding units in the inter coded slice as compared to the intra coding units in the intra coded slice and/or the inter coding units, preferably as compared to the intra coding units in the intra coded slice and the inter coding units.

In an alternative or complementary embodiment, the processor 82 is operable to calculate the rate-distortion cost by using a scaling factor for distortion of one for the large transform size for the intra coding units in the intra coded slice and/or the inter coding units, preferably for the intra coding units in the intra coded slice and/or the inter coding units. The processor 82 is also operable to calculate the rate-distortion cost by using a scaling factor for distortion larger than one for the large transform size for the intra coding units in the inter coded slice.

In another alternative of complementary embodiment, the processor 82 is operable to calculate the rate-distortion cost by adding a penalty value to a distortion value for the large transform size for the intra coding units in the inter coded slice.

The encoder 80 as illustrated in FIG. 15 may optionally comprise an input unit 81 connected to the processor 82 and operable to receive the pictures of the video stream. The input unit 81 thereby forwards the pictures to be encoded by the processor 82 of the encoder 80 either directly to the encoder 82 or to the memory 84, from which the pictures can be fetched by the processor 82. The encoder 80 optionally also comprises an output unit 83 connected to the processor 82 and operable to output a coded bitstream with encoded representations of the pictures in the video stream. This coded bitstream is preferably in the form of NAL units as previously disclosed herein, optionally encapsulated with different transport headers to form data packets. Non-limiting examples include Real-time Transport Protocol (RTP), User Datagram Protocol (UDP) and/or Internet Protocol (IP) headers.

Hence, the encoder 80 as described herein could be implemented e.g. by one or more of a processor 82 and adequate software with suitable storage or memory 84 therefore, a programmable logic device (PLD) or other electronic component(s) as shown in FIG. 15. In addition, the encoder 80 preferably comprises an input or input unit 81 configured to receive the pictures of the video stream. A corresponding output or output unit 83 is configured to output the encoded representations of the slices, preferably in the form of NAL units.

In FIG. 15, the encoder 80 has been illustrated as comprising a processor 82. This processor 82 could be implemented as a single processor or multiple processors, such as in the form of a processing circuitry.

FIG. 14 is a schematic block diagram of an encoder 20 configured to encode a picture according to an embodiment. The encoder 20 comprises a restriction unit 22 configured to restrict the use of large transforms. According to an embodiment it also comprises an output unit 23 configured to send a bitstream comprising information of the restriction.

The encoder 20 of FIG. 14 with its including units 22, 23 could be implemented in hardware. There are numerous variants of circuitry elements that can be used and combined to achieve the functions of the units 22, 23 of the encoder 20. Such variants are encompassed by the embodiments. Particular examples of hardware implementation of the encoder 20 are implementation in DSP hardware and integrated circuit technology, including both general-purpose electronic circuitry and application-specific circuitry.

As indicated in the foregoing and shown in FIG. 15, the encoder 80 may alternatively be defined as a group of function modules, where the function modules are implemented as a computer program running on a processor 82.

The computer program residing in memory 84 may thus be organized as appropriate function modules configured to perform, when executed by the processor 82, at least part of the steps and/or tasks described above. Examples of such function modules are illustrated in FIGS. 16 and 17.

FIG. 16 is thereby a schematic block diagram illustrating an example of an encoder 40 comprising a slice encoding module 42 for encoding at least one slice in at least one picture of a video stream by using a smaller maximum transform size for intra coding units in an inter coded slice as compared to intra coding units in an intra coded slice and/or inter coding units.

FIG. 17 is a schematic block diagram illustrating another example of an encoder 70 comprising a penalizing module 72 for penalizing usage of a large transform size for intra coding units in an inter coded slice in at least one picture of a video stream as compared to intra coding units in an intra coded slice and/or inter coding units when calculating a rate-distortion cost for encoding a slice according to different encoding modes.

In the following, an example of a computer implementation will be described with reference to FIG. 24. A user terminal 200, such as a computer, video camera, a mobile device, such as mobile telephone, comprises a processor 210 and a memory 220. The processor 210 and the memory 220 are interconnected to each other to enable normal software execution. An optional input/output unit (not shown) may also be interconnected to the processor 210.

In a particular embodiment, a computer program 230 comprises program code which when executed by the processor 210 or user terminal 200 causes the processor 210 or user terminal 200 to encode at least one slice in at least one picture of a video stream by using a smaller maximum transform size for intra coding units in an inter coded slice as compared to intra coding units in an intra coded slice and/or inter coding units.

Alternatively, the program code of the computer program 230 causes, when executed by the processor 210 or user terminal 200, the processor 210 of user terminal 200 to penalize usage of a large transform size for intra coding units in an inter coded slice in at least one picture of a video stream as compared to intra coding units in an intra coded slice and/or inter coding units when calculating a rate-distortion cost for encoding a slice according to different encoding modes.

The figure also illustrates a computer program product 240 comprising computer-readable medium and a computer program 230 as described above stored on the computer-readable medium. The computer-readable medium may include one or more removable or non-removable memory devices including, but not limited to a ROM, a RAM, a Compact Disc (CD), a Digital Versatile Disc (DVD), a Universal Serial Bus (USB), memory, a Hard Disk Drive (HDD) storage device, a flash memory, or any other conventional memory device. The computer program 230 may thus be loaded into the operating memory 220 of the user terminal 200 or equivalent processing device for execution by the processor 210 thereof.

The user terminal 200 or processor 210 does not have to be dedicated to only execute the above-described steps, functions, procedure and/or blocks, but may also execute other tasks.

The term 'computer' should be interpreted in a general sense as any system or device capable of executing program code or computer program instructions to perform a particular processing, determining or computing task.

Thus, a further related aspect of the embodiments defines a computer program for encoding a picture. The computer program comprises code means which when executed by a processor causes the processor to restrict the use of large transforms.

Another additional aspect of the embodiments relates to a computer program product comprising computer readable medium and a computer program stored on the computer readable medium.

The encoder 62 can, for example, be located in a transmitter 60, such as in a video camera e.g. in a mobile device as shown in FIG. 18. The transmitter 60 then comprises an input or input unit 61 configured to receive pictures of a video stream to be encoded. The pictures are encoded by the encoder 62 as disclosed herein. Encoded pictures are output from the transmitter 60 by an output or output unit 63 in the form of a coded bitstream, such as of NAL units or data packets carrying such NAL units.

Thus, an embodiment relates to a transmitter 60 comprising an input unit operable to receive pictures of a video stream. The transmitter 60 also comprises an encoder 62 according to the embodiments connected to the input unit 61. The transmitter 60 further comprises an output unit 63 connected to the encoder 62 and operable to output a coded bitstream with encoded representations of the pictures in the video stream.

An aspect relates to a mobile device comprising a transmitter as shown in FIG. 18.

A receiver comprising the encoder is also provided.

According to a further aspect a decoder is provided. The decoder is configured to receive information relating to the restriction and to use the restriction when decoding the picture.

FIG. 19 is a schematic block diagram of a decoder 10 according to the embodiments. The decoder 10 comprises an input unit 11 configured to receive the bitstream with the information of the restriction. The decoder 10 further comprises a decoding unit 12 which is configured to use this restriction information when decoding the picture.

The decoder 10 of FIG. 1 with its including units 11, 12 could be implemented in hardware. There are numerous variants of circuitry elements that can be used and combined to achieve the functions of the units 11, 12 of the decoder 10. Such variants are encompassed by the embodiments. Particular examples of hardware implementation of the decoder are implementation in DSP hardware and integrated circuit technology, including both general-purpose electronic circuitry and application-specific circuitry.

The decoder 50 described herein could alternatively be implemented e.g. by one or more of a processor 52 and adequate software with suitable storage or memory 54 therefore, a PLD or other electronic component(s) as shown in FIG. 20. In addition, the decoder 50 preferably comprises an input or input unit 51 configured to receive the encoded representations of pictures, such as in the form of NAL units. A corresponding output or output unit 53 is configured to output the decoded pictures.

Typically, a reference picture buffer (RPB), also referred to as a decoded data buffer (DPB), is an integrated part of the decoder 50. The memory 54 may contain the reference picture buffer plus other things needed for decoding.

The decoder 32 can, for example, be located in a receiver 30, such as in a video camera, set-top-box or a display, e.g. in a mobile device as shown in FIG. 21. The receiver 30 then comprises an input or input unit 31 configured to receive a coded bitstream, such as data packets of NAL units. The encoded representations of the NAL units are decoded by the decoder 32 as disclosed herein. The decoder 32 preferably comprises or is connected to a reference picture buffer 34 that temporarily stores already decoded pictures that are to be used as reference pictures for other pictures in the video stream. Decoded pictures are output from the receiver 30, such as from the reference picture buffer 34, by means of an output or output unit 33. These output pictures are sent to be displayed to a user on a screen or display of or connected, including wirelessly connected, to the receiver 30. The output pictures may also be stored on disk or transcoded without display.

In an embodiment, the decoder 10, 32, 50 is operable to retrieve, based on a coded bitstream with encoded representation of at least one slice in at least one picture of a video stream, (first) information, log 2_diff_max_min_transform_block size_intra, representing a difference between a maximum and a minimum transform block size for intra coding units in an inter coded slice. The decoder 10, 32, 50 is also operable to retrieve, based on the coded bitstream, (second) information, log 2_diff_max_min_transform_block_size, representing a difference between a maximum and a minimum transform block size for intra coding units in an intra coded slice and/or inter coding units. The decoder 10, 32, 50 is further operable to determine, based on the (first) information log 2_diff_max_min_transform_block_size_intra, a maximum transform size, Log 2MaxTrafoSize, for the intra coding units in the inter coded slice. The decoder 10, 32, 50 is additionally operable to determine, based on the (second) information log 2_diff_max_min_transform_block_size a maximum transform size, Log 2MaxTrafoSize, for the intra coding units in the intra coded slice and/or the inter coding units. In this embodiment, log 2_diff_max_min_transform_block_size has a value different from log 2_diff_max_min_transform_block_size_intra.

The decoder 10, 32, 50 is preferably operable to retrieve the (first and second) information, log 2_diff_max_min_transform_block_size_intra and log 2_diff_max_min_transform_block_size, from a parameter set of or associated with the coded bitstream. In such a case, the decoder 10, 32, 50 preferably identifies the relevant parameter set based a parameter set identifier retrieved from a slice header of an encoded representation of a slice in the coded bitstream. The parameter set could be a PPS, an SPS or a VPS, preferably an SPS. The retrieved parameter set identifier then directly enables identification of the parameter set, e.g. a PPS identifier identifying a PPS, or can be used to identify a parameter set, e.g. a PPS, comprising a second parameter set identifier, e.g. an SPS identifier, that identifies the parameter set, e.g. SPS.

Alternatively, the decoder 10, 32, 50 could be operable to retrieve the (first and second) information, log 2_diff_max_min_transform_block size_intra and log 2_diff_max_min_transform_block size, from a slice header of an encoded representation of a slice in the coded bitstream.

In an embodiment, the decoder 10, 32, 50 is preferably operable to determine the maximum transform size based on the retrieved (first or second) information, log 2_diff_max_min_transform_block_size_intra or log 2_diff_max_min_transform_block_size, and based on (third) information, log 2_min_transform_block_size_minus2, representing a minimum transform block size. The (third) information, log 2_min_transform_block_size_minus2, could be retrieved from a parameter set or a slice header similar to the (first and second) information, log 2_diff_max_min_transform_block_size_intra and log 2_diff_max_min_transform_block_size, discussed in the foregoing.

In an embodiment, the decoder 10, 32, 50 is preferably operable to determine the maximum transform size, Log 2MaxTrafoSize, for the intra coding units in the intra coded slice and/or the inter coding units to be based on, and preferably equal to, log 2_min_transform_block_size_minus2+2+log 2_diff_max_min_transform_block_size.

In an embodiment, the decoder 10, 32, 50 is preferably operable to determine the maximum transform size, Log 2MaxTrafoSize, for the intra coding units in the inter coded slice to be based on, and preferably equal to, log 2_min_transform_block_size_minus2+2+log 2_diff_max_min_transform_block_size_intra.

A corresponding method for this aspect involves a method performed by a decoder 10, 32, 50 comprising the decoder 10, 32, 50 retrieving, based on a coded bitstream with encoded representation of at least one slice in at least one picture of a video stream, information, log 2_diff_max_min_transform_block_size_intra, representing a difference between a maximum and a minimum transform block size for intra coding units in an inter coded slice. The method also comprises the decoder 10, 32, 50 retrieving, based on the coded bitstream, information, log 2_diff_max_min_transform_block_size, representing a difference between a maximum and a minimum transform block size for intra coding units in an intra coded slice and/or inter coding units. The method further comprises the decoder 10, 32, 50 determining, based on the information log 2_diff_max_min_transform_block_size_intra, a maximum transform size, Log 2MaxTrafoSize, for the intra coding units in the inter coded slice. The method additionally comprises the decoder 10, 32, 50 determining, based on the information log 2_diff_max_min_transform_block size a maximum transform size, Log 2MaxTrafoSize, for the intra coding units in the intra coded slice and/or said inter coding units. In this embodiment, log 2_diff_max_min_transform_block_size has a value different from log 2_diff_max_min_transform_block_size_intra.

In another embodiment, the decoder 10, 32, 50 is operable to retrieve, based on a coded bitstream with encoded representation of at least one slice in at least one picture of a video stream, (first) information, log 2_min_transform_block_size_minus2, representing a minimum transform block size. The decoder 10, 32, 50 is also operable to retrieve, based on the coded bitstream, (second) information, log 2_diff_max_min_transform_block_size, representing a difference between a maximum transform block size and the minimum transform block size. The decoder 10, 32, 50 is further operable to determine a maximum transform size, Log 2MaxTrafoSize, for intra coding units in an intra coded slice and/or inter coding units based on the (first) information, log 2_min_transform_block_size_minus2, and the (second) information, log 2_diff_max_min_transform_block_size. The decoder 10, 32, 50 is additionally operable to determine a maximum transform size, Log 2MaxTrafoSize, for intra coding units in an inter coded slice based on the (first) information, log 2_min_transform_block_size_minus2, and a minimum of a value represented by the (second) information, log 2_diff_max_min_transform_block_size, and a predefined value.

The decoder 10, 32, 50 is preferably operable to retrieve the (first and second) information, log 2_min_transform_block_size_minus2 and log 2_diff_max_min_transform_block_size, from a parameter set of or associated with the coded bitstream, such as from a PPS, an SPS or a VPS, preferably from an SPS, as previously described herein. Alternatively, the decoder 10, 32, 50 is operable to retrieve the (first and second) information, log 2_min_transform_block_size_minus2 and log 2_diff_max_min_transform_block_size, from a slice header of an encoded representation of a slice in the coded bitstream.

In an embodiment, the decoder 10, 32, 50 is preferably operable to determine the maximum transform size, Log 2MaxTrafoSize, for the intra coding units in the intra coded slice and/or the inter coding units to be based on and preferably equal to log 2_min_transform_block_size_minus2+2+log 2_diff_max_min_transform_block_size.

In an embodiment, the predefined value is preferably 2.

In an embodiment, the decoder 10, 32, 50 is preferably operable to determine the maximum transform size, Log 2MaxTrafoSize, for the intra coding units in the inter coded slice to be based on and preferably equal to log 2_min_ transform_block size_minus2+2+min(log 2_diff_max_min_ transform_block size, 2).

A corresponding method for this aspect involves a method performed by a decoder 10, 32, 50 comprising the decoder retrieving, based on a coded bitstream with encoded representation of at least one slice in at least one picture of a video stream, information, log 2_min_transform_block size_minus2, representing a minimum transform block size. The method also comprises the decoder 10, 32, 50 retrieving, based on the coded bitstream, information, log 2_diff_max_min_transform_block size, representing a difference between a maximum transform block size and said minimum transform block size. The method further comprises the decoder 10, 32, 50 determining a maximum transform size, Log 2MaxTrafoSize, for intra coding units in an intra coded slice and/or inter coding units based on the information, log 2_min_transform_block size_minus2, and the information, log 2_diff_max_min_transform_block size. The method additionally comprises the decoder 10, 32, 50 determining a maximum transform size, Log 2MaxTrafoSize, for intra coding units in an inter coded slice based on the information, log 2_min_transform_block_size_minus2, and a minimum of a value represented by the information, log 2_diff_max_min_transform_block size, and a predefined value.

The encoder and/or the decoder can be implemented in a device such as a video camera or a rendering device.

FIG. 22 is a schematic block diagram of a user terminal 2, represented as a mobile device or telephone, according to an embodiment.

The user terminal 2 can be any device having video encoding and/or decoding functions. Non-limiting examples of such user terminals 2 include mobile telephones and other portable media players, tablets, desktops, notebooks, personal video recorders, multimedia players, video streaming servers, set-top boxes, TVs, computers, decoders, game consoles, video cameras, etc. The user terminal 2 comprises a memory 4 configured to store pictures of a video stream and/or encoded representations of a coded bitstream. These encoded representations can have been generated by the user terminal 2 itself, such as by an encoder 1 connected to the memory 4. Alternatively, the encoded representations are generated by some other device and wirelessly transmitted or transmitted by wire to the user terminal 2. The user terminal 2 then comprises a transceiver (transmitter and receiver) or input and output (I/O) unit 3 to achieve the data transfer.

In FIG. 22, the user terminal 2 has been illustrated as comprising both a decoder 10 and a media player 5, with the decoder 10 implemented as a part of the media player 5. This should, however, merely be seen as an illustrative but non-limiting example of an implementation embodiment for the user terminal 2. Also distributed implementations are possible where the decoder 10 and the media player 5 are provided in two physically separated devices are possible and within the scope of user terminal 2 as used herein. A display 6 for display of decoded video data could also be provided as a separate device connected to the user terminal 2 or indeed constituting part of the user terminal 2.

The user terminal 2 of FIG. 22 has been illustrated as both comprising the encoder 1 and the decoder 10. This should, however, merely be seen as an illustrative example. In other embodiments, the user terminal 2 does not comprise any encoder 1 or does not comprise any decoder 10. In the latter case, also the display 6 and/or media player 5 may also be omitted from the user terminal 2.

Hence, an aspect of the embodiments relates to a user terminal 2 comprising an encoder 1 according to the embodiments and/or a decoder 10 according to the embodiments.

The embodiments apply to a decoder, an encoder and an element that operates on a bitstream, such as a network node or a Media Aware Network Element comprising a decoder and/or an encoder.

FIG. 23 illustrates a network device 110 being or belonging to a network node 110 in a communication network 100, such as a wireless, radio-based communication network. The network device 110 comprises an encoder 1 according to the embodiments and/or a decoder 10 according to the embodiments.

The network device 110 may be a device for converting video according to one video coding standard to another video coding standard, for example, if it has been established that a receiving user terminal 130 is only capable of or prefers another video coding standard than the one sent from a sending user terminal 120. The network device 110 can be in the form of or comprised in a radio base station, a Node-B or any other network node in a communication network 100, such as a radio-based network.

The embodiments are not limited to HEVC but may be applied to any extension of HEVC such as a scalable extension or multiview extension or to a different video codec. The embodiments are applicable to 2D and 3D video.

It is to be understood that the choice of interacting units or modules, as well as the naming of the units are only for exemplary purpose, and may be configured in a plurality of alternative ways in order to be able to execute the disclosed process actions.

It should also be noted that the units or modules described in this disclosure are to be regarded as logical entities and not with necessity as separate physical entities. It will be appreciated that the scope of the technology disclosed herein fully encompasses other embodiments which may become obvious to those skilled in the art, and that the scope of this disclosure is accordingly not to be limited.

Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In the preceding description, for purposes of explanation and not limitation, specific details are set forth such as particular architectures, interfaces, techniques, etc. in order to provide a thorough understanding of the disclosed technology. However, it will be apparent to those skilled in the art that the disclosed technology may be practiced in other embodiments and/or combinations of embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

The functions of the various elements including functional blocks may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

The embodiments described above are to be understood as a few illustrative examples of the present invention. It will be understood by those skilled in the art that various modifications, combinations and changes may be made to the embodiments without departing from the scope of the present technology. In particular, different part solutions in the different embodiments can be combined in other configurations, where technically possible.

REFERENCES

[1] Recommendation ITU-R BT.500-13, "Methodology for subjective assessment of the quality of the television pictures", 2012.
[2] HEVC reference software, https://hevc.hhi.fraunhofer.de/svn/svn HEVCSoftware/tags/HM-11.0
[3] E. D. Gelasca, "Full-reference objective quality metrics for video watermarking, video segmentation and 3D model watermarking", Ph.D. thesis, EPFL, September 2005.
[4] F. D. Simone, M. Naccari, M. Tagliasacchi, F. Dufaux, S. Tubaro, and T. Ebrahimi, "Subjective quality assessment of H.264/AVC video streaming with packet losses", EURASIP Journal on Image and Video Processing, vol. 2011, 12 pages.
[5] Joint Collaborative Team on Video Coding (JCT-VC) of ITUT-T SG16 WP3 and ISO/IEC JTC1/SC29/WG11, HM Software Manual

The invention claimed is:

1. A method performed by an encoder comprising:
   determining if at least one slice in at least one picture of a video stream is an intra coded slice or an inter coded slice, wherein the at least one slice comprises a plurality of slices;
   in response to determining the at least one slice in the at least one picture of the video stream is an intra coded slice, encoding the at least one slice by using a first maximum transform size for intra coding units in the intra coded slice;
   in response to determining the at least one slice in the at least one picture of the video stream is an inter coded slice and the at least one picture includes a defined characteristic of encoding complexity, encoding the at least one slice in the at least one picture of the video stream by using a second maximum transform size for intra coding units in the inter coded slice, the second maximum transform size for intra coding units in the inter coded slice always being a smaller maximum transform size than the first maximum transform size for intra coding units in the intra coded slice; and
   initiating transmission, via transmitting circuitry towards a recipient via a network, of the encoded at least one slice in the at least one picture of the video stream with information providing an indication of whether the first maximum transform size for intra coding units in the intra coded slice or the second maximum transform size for intra coding units in the inter coded slice was used in the encoding.

2. The method according to claim 1, wherein encoding said at least one slice comprises:
   encoding an inter slice in said at least one picture by using a maximum transform size of 16×16 pixels for intra coding units in said inter slice; and
   encoding a slice in said at least one picture by using a maximum transform size of 32×32 pixels for intra coding units in an intra slice.

3. The method according to claim 1, further comprising:
   specifying information, log 2_diff_max_min_transform_block_size, representing a difference between a maximum and a minimum transform block size for said intra coding units in said intra coded slice and/or said inter coding units;
   specifying information, log 2_diff_max_min_transform_block_size_intra, representing a difference between a maximum and a minimum transform block size for said intra coding units in said inter coded slice; and
   including said information, log 2_diff_max_min_transform_block_size and log 2_diff_max_min_transform_block_size_intra, in a coded bitstream with encoded representation of said at least one slice, wherein log 2_diff_max_min_transform_block_size having a value different from log 2_diff_max_min_transform_block_size_intra.

4. The method according to claim 1, wherein encoding said at least one slice comprises:
   encoding an inter slice in said at least one picture by restricting a maximum transform size, Log 2MaxTrafoSize, for intra coding units in said inter slice to be equal to log 2_min_transform_block_size_minus2+2+min(log 2_diff_max_min_transform_block_size, 2); and
   encoding a slice in said at least one picture by using a maximum transform size, Log 2MaxTrafoSize, for intra coding units in an intra slice and/or inter coding units to be equal to log 2_min_transform_block_size_minus2+2+log 2_diff_max_min_transform_block_size, wherein log 2_min_transform_block_size_minus2 represents a minimum transform block size and log 2_diff_max_min_transform_block_size specifies a difference between said minimum transform block size and a maximum transform block size.

5. The method according to claim 1, wherein the defined characteristic of encoding complexity includes one of water, rain, fire, or smoke, and wherein encoding the at least one slice comprises:

in response to determining the at least one slice in the at least one picture of the video stream is an inter coded slice and the at least one picture includes one of water, rain, fire, or smoke, encoding the at least one slice in the at least one picture of the video stream by using a second maximum transform size for intra coding units in the inter coded slice, the second maximum transform size for intra coding units in the inter coded slice always being a smaller maximum transform size than the first maximum transform size for intra coding units in the intra coded slice.

6. An encoder configured to encode at least one slice in at least one picture of a video stream by:

determining if at least one slice in at least one picture of a video stream is an intra coded slice or an inter coded slice, wherein the at least one slice comprises a plurality of slices;

in response to determining the at least one slice in the at least one picture of the video stream is an intra coded slice, encoding the at least one slice by using a first maximum transform size for intra coding units in the intra coded slice;

in response to determining the at least one slice in the at least one picture of the video stream is an inter coded slice and the at least one picture includes a defined characteristic of encoding complexity, encoding the at least one slice in the at least one picture of the video stream by using a second maximum transform size for intra coding units in the inter coded slice, the second maximum transform size for intra coding units in the inter coded slice always being a smaller maximum transform size than the first maximum transform size for intra coding units in the intra coded slice; and initiating transmission, via transmitting circuitry towards a recipient via a network, of the encoded at least one slice in the at least one picture of the video stream with information providing an indication of whether the first maximum transform size for intra coding units in the intra coded slice or the second maximum transform size for intra coding units in the inter coded slice was used in the encoding.

7. The encoder according to claim 6, further comprising a processor; and a memory connected to said processor and comprising computer readable program code that when executed by said processor causes said processor to encode said at least one slice in said memory by using said second maximum transform size for said intra coding units in said inter coded slice as compared to said first maximum transform size for said intra coding units in said intra coded slice.

8. The encoder according to claim 7, wherein said processor is to:

encode an inter slice in said at least one picture by using a maximum transform size of 16×16 pixels for intra coding units in said inter slice; and encode a slice in said at least one picture by using a maximum transform size of 32×32 pixels for intra coding units in an intra slice.

9. The encoder according to claim 7, wherein said processor is to generate a coded bitstream with encoded representation of said at least one slice, wherein intra coding units of an encoded representation of an inter slice are restricted to have a smaller maximum transform size as compared to intra coding units of an encoded representation of an intra slice and/or inter coding units of said encoded representation of said inter slice.

10. The encoder according to claim 7, wherein said processor is to:

specify information, log 2_diff_max_min_transform_block_size, representing a difference between a maximum and a minimum transform block size for said intra coding units in said intra coded slice and/or said inter coding units;

specify information, log 2_diff_max_min_transform_block_size_intra, representing a difference between a maximum and a minimum transform block size for said intra coding units in said inter coded slice; and include said information, log 2_diff_max_min_transform_block_size and log 2_diff_max_min_transform_block_size_intra, in a coded bitstream with encoded representation of said at least one slice, wherein log 2_diff_max_min_transform_block_size having a value different from log 2_diff_max_min_transform_block_size_intra.

11. The encoder according to claim 7, wherein said processor is to:

encode an inter slice in said at least one picture by restricting a maximum transform size, Log 2MaxTrafoSize, for intra coding units in said inter slice to be equal to log 2_min_transform_block_size_minus2+2+min(log 2_diff_max_min_transform_block_size, 2); and encode a slice in said at least one picture by using a maximum transform size, Log 2MaxTrafoSize, for intra coding units in an intra slice and/or inter coding units to be equal to log 2_min_transform_block_size_minus2+2+log 2_diff_max_min_transform_block_size, wherein log 2_min_transform_block_size_minus2 represents a minimum transform block size and log 2_diff_max_min_transform_block_size specifies a difference between said minimum transform block size and a maximum transform block size.

12. A method performed by an encoder, the method comprising:

determining if at least one slice in at least one picture of a video stream is an intra coded slice or an inter coded slice;

in response to determining the at least one slice in the at least one picture of the video stream is an intra coded slice, encoding the at least one slice by using a first maximum transform size for intra coding units in the intra coded slice;

in response to determining the at least one slice in the at least one picture of the video stream is an inter coded slice, encoding the at least one slice in the at least one picture of the video stream by using a second maximum transform size for intra coding units in the inter coded slice, wherein encoding the at least one slice comprises generating a coded bitstream with encoded representation of the at least one slice, wherein intra coding units of an encoded representation of an inter slice are restricted to have a smaller maximum transform size as compared to a maximum transform size of intra coding units of an encoded representation of an intra slice; and initiating transmission, via transmitting circuitry towards a recipient via a network, of the encoded at least one slice in the at least one picture of the video stream with information providing an indication of whether the first maximum transform size for intra coding units in the intra coded slice or the second maximum transform size for intra coding units in the inter coded slice was used in the encoding.

13. A method performed by an encoder comprising:
determining if at least one slice in at least one picture of a video stream is an intra coded slice or an inter coded slice, wherein the at least one slice comprises a plurality of slices;
in response to determining the at least one slice in the at least one picture of the video stream is an intra coded slice, encoding the at least one slice by using a first maximum transform size for intra coding units in the intra coded slice;
in response to determining the at least one slice in the at least one picture of the video stream is an inter coded slice, encoding the at least one slice in the at least one picture of the video stream by using a second maximum transform size for intra coding units in the inter coded slice, the second maximum transform size for intra coding units in the inter coded slice being a smaller maximum transform size than the first maximum transform size for intra coding units in the intra coded slice; and
initiating transmission, via transmitting circuitry towards a recipient via a network, of the encoded at least one slice in the at least one picture of the video stream with information providing an indication of whether the first maximum transform size for intra coding units in the intra coded slice or the second maximum transform size for intra coding units in the inter coded slice was used in the encoding,
wherein encoding said at least one slice comprises:
restricting a search space with regard to transform size up to 16×16 pixels when selecting an intra coding unit in an inter coded slice that results in a lowest rate-distortion cost of multiple candidate intra coding units; and
allowing a search space with regard to transform size up to 32×32 pixels when selecting an intra coding unit in an intra coded slice or an inter coding unit that results in a lowest rate-distortion cost of multiple candidate intra coding units or multiple candidate inter coding units.

14. An encoder comprising:
a processor; and
a memory connected to said processor and comprising computer readable program code that when executed by said processor causes said processor to perform operations comprising:
determining if at least one slice in at least one picture of a video stream is an intra coded slice or an inter coded slice, wherein the at least one slice comprises a plurality of slices;
in response to determining the at least one slice in the at least one picture of the video stream is an intra coded slice, encoding the at least one slice by using a first maximum transform size for intra coding units in the intra coded slice;
in response to determining the at least one slice in the at least one picture of the video stream is an inter coded slice, encoding the at least one slice in the at least one picture of the video stream by using a second maximum transform size for intra coding units in the inter coded slice, the second maximum transform size for intra coding units in the inter coded slice being a smaller maximum transform size than the first maximum transform size for intra coding units in the intra coded slice; and
initiating transmission, via transmitting circuitry towards a recipient via a network, of the encoded at least one slice in the at least one picture of the video stream with information providing an indication of whether the first maximum transform size for intra coding units in the intra coded slice or the second maximum transform size for intra coding units in the inter coded slice was used in the encoding,
wherein said processor is to perform further operations comprising:
restricting a search space with regard to transform size to 16×16 pixels when selecting an intra coding unit in an inter coded slice that results in a lowest rate-distortion cost of multiple candidate intra coding units; and
allowing a search space with regard to transform size up to 32×32 pixels when selecting an intra coding unit in an intra coded slice or an inter coding unit that results in a lowest rate-distortion cost of multiple candidate intra coding units or multiple candidate inter coding units.

15. A transmitter comprising:
an input circuit configured to receive pictures of a video stream;
an encoder connected to said input circuit; and
an output circuit connected to said encoder and configured to output a coded bitstream with encoded representations of said pictures in said video stream;
wherein said encoder is configured to encode at least one slice in at least one picture of a video stream by:
determining if at least one slice in at least one picture of a video stream is an intra coded slice or an inter coded slice, wherein the at least one slice comprises a plurality of slices;
in response to determining the at least one slice in the at least one picture of the video stream is an intra coded slice, encoding the at least one slice by using a first maximum transform size for intra coding units in the intra coded slice;
in response to determining the at least one slice in the at least one picture of the video stream is an inter coded slice and the at least one picture includes a defined characteristic of encoding complexity, encoding the at least one slice in the at least one picture of the video stream by using a second maximum transform size for intra coding units in the inter coded slice, the second maximum transform size for intra coding units in the inter coded slice always being a smaller maximum transform size than the first maximum transform size for intra coding units in the intra coded slice; and
initiating transmission, via transmitting circuitry towards a recipient via a network, of the encoded at least one slice in the at least one picture of the video stream with information providing an indication of whether the first maximum transform size for intra coding units in the intra coded slice or the second maximum transform size for intra coding units in the inter coded slice was used in the encoding.

16. A computer program product comprising a non-transitory computer readable medium containing program code which when executed by a processor causes said processor to encode at least one slice in at least one picture of a video stream by:

determining if at least one slice in at least one picture of a video stream is an intra coded slice or an inter coded slice, wherein the at least one slice comprises a plurality of slices;

in response to determining the at least one slice in the at least one picture of the video stream is an intra coded slice, encoding the at least one slice by using a first maximum transform size for intra coding units in the intra coded slice;

in response to determining the at least one slice in the at least one picture of the video stream is an inter coded slice and the at least one picture includes a defined characteristic of encoding complexity, encoding the at least one slice in the at least one picture of the video stream by using a second maximum transform size for intra coding units in the inter coded slice, the second maximum transform size for intra coding units in the inter coded slice always being a smaller maximum transform size than the first maximum transform size for intra coding units in the intra coded slice; and initiating transmission, via transmitting circuitry towards a recipient via a network, of the encoded at least one slice in the at least one picture of the video stream with information providing an indication of whether the first maximum transform size for intra coding units in the intra coded slice or the second maximum transform size for intra coding units in the inter coded slice was used in the encoding.

17. An encoder comprising a slice encoding module for encoding at least one slice in at least one picture of a video stream by:

determining if at least one slice in at least one picture of a video stream is an intra coded slice or an inter coded slice, wherein the at least one slice comprises a plurality of slices;

in response to determining the at least one slice in the at least one picture of the video stream is an intra coded slice, encoding the at least one slice by using a first maximum transform size for intra coding units in the intra coded slice;

in response to determining the at least one slice in the at least one picture of the video stream is an inter coded slice and the at least one picture includes a defined characteristic of encoding complexity, encoding the at least one slice in the at least one picture of the video stream by using a second maximum transform size for intra coding units in the inter coded slice, the second maximum transform size for intra coding units in the inter coded slice always being a smaller maximum transform size than the first maximum transform size for intra coding units in the intra coded slice; and initiating transmission, via transmitting circuitry towards a recipient via a network, of the encoded at least one slice in the at least one picture of the video stream with information providing an indication of whether the first maximum transform size for intra coding units in the intra coded slice or the second maximum transform size for intra coding units in the inter coded slice was used in the encoding.

18. A method performed by an encoder comprising:

for each of a plurality of different encoding modes, calculating a rate-distortion cost for the encoding mode, wherein calculating the rate-distortion cost comprises biasing to increase only the cost of using a larger transform size for encoding intra coding units in an inter coded slice to reduce usage of the larger transform size for encoding intra coding units in an inter coded slice in at least one picture of a video stream as compared to a first transform size used for encoding intra coding units in an intra coded slice in the at least one picture;

selecting an encoding mode from among the different encoding modes based on the calculated rate-distortion cost for each of the plurality of different encoding modes;

encoding a slice according to the encoding mode that is selected; and initiating transmission, via transmitting circuitry towards a recipient via a network, of the encoded slice with information providing an indication of the selected encoding mode.

19. The method according to claim 18, wherein biasing to increase the cost of using said larger transform size comprises calculating said rate-distortion cost by using a lower lambda for said intra coding units in said inter coded slice as compared to said intra coding units in said intra coded slice.

20. The method according to claim 18, wherein biasing to increase the cost of using said larger transform size comprises:

calculating said rate-distortion cost by using a scaling factor for distortion of one for said large transform size for said intra coding units in said intra coded slice; and calculating said rate-distortion cost by using a scaling factor for distortion larger than one for said large transform size for said intra coding units in said inter coded slice.

21. The method according to claim 18, wherein biasing to increase the cost of using said larger transform size comprises calculating said rate-distortion cost by adding a penalty value to a distortion value for said larger transform size for said intra coding units in said inter coded slice.

22. The method according to claim 18, wherein said larger transform size is 32×32 pixels.

23. An encoder configured to:

for each of a plurality of different encoding modes, calculate the rate-distortion cost for each of the plurality of different encoding mode, wherein calculating the rate-distortion cost comprises biasing to increase only the cost of using a larger transform size for encoding intra coding units in an inter coded slice to reduce usage of the larger transform size for encoding intra coding units in an inter coded slice in at least one picture of a video stream as compared to a first transform size used for encoding intra coding units in an intra coded slice in the at least one picture;

select an encoding mode from among the different encoding modes based on the calculated rate-distortion cost for each of the plurality of different encoding modes;

encode a slice according to the encoding mode that is selected; and initiating transmission, via transmitting circuitry towards a recipient via a network, of the encoded slice with information providing an indication of the selected encoding mode.

24. The encoder according to claim 23, further comprising:

a processor; and a memory connected to said processor and comprising computer readable program code that when executed by said processor causes said processor to perform:

the calculation of the rate-distortion cost for each of the different encoding modes;

the selection of the encoding mode of the different encoding modes;

the encoding of the slice according to the encoding mode that is selected; and the initiating of the transmission of the encoded slice with information providing an indication of the selected encoding mode.

25. The encoder according to claim 24, wherein said processor is to bias to increase said rate-distortion cost by using a lower lambda for said intra coding units in said inter coded slice as compared to said intra coding units in said intra coded slice and/or said inter coding units.

26. The encoder according to claim 24, wherein said processor, to bias to increase the cost, is to:
calculate said rate-distortion cost by using a scaling factor for distortion of one for said large transform size for said intra coding units in said intra coded slice and/or said inter coding units; and
calculate said rate-distortion cost by using a scaling factor for distortion larger than one for said large transform size for said intra coding units in said inter coded slice.

27. The encoder according to claim 24, wherein said processor, to bias to increase the cost, is to calculate said rate-distortion cost by adding a penalty value to a distortion value for said large transform size for said intra coding units in said inter coded slice.

28. A computer program product comprising a non-transitory computer readable medium containing program code which when executed by a processor causes said processor to:
for each of a plurality of different encoding modes, calculate a rate-distortion cost for the encoding mode, wherein calculating the rate-distortion cost comprises biasing to increase only the cost of using a larger transform size for encoding intra coding units in an inter coded slice to reduce usage of the larger transform size for encoding intra coding units in an inter coded slice in at least one picture of a video stream as compared to a first transform size used for encoding intra coding units in an intra coded slice in the at least one picture;
select an encoding mode from among the different encoding modes based on the calculated rate-distortion for each of the plurality of different encoding modes;
encode a slice according to the encoding mode that is selected; and
initiate transmission, via transmitting circuitry towards a recipient via a network, of the encoded slice with information providing an indication of the selected encoding mode.

29. An encoder comprising a processor configured to perform operations comprising:
for each of a plurality of different encoding modes, calculating the rate-distortion cost of different encoding modes, wherein calculating the rate-distortion cost comprises biasing to increase only the cost of using a larger transform size for encoding intra coding units in an inter coded slice to reduce usage of the larger transform size for encoding intra coding units in an inter coded slice in at least one picture of a video stream as compared to a first transform size used for encoding intra coding units in an intra coded slice in the at least one picture;
selecting an encoding mode from among the different encoding modes based on the calculated rate-distortion cost for each of the plurality of different encoding modes;
encoding a slice according to the encoding mode that is selected; and
initiating transmission, via transmitting circuitry towards a recipient via a network, of the encoded slice with information providing an indication of the selected encoding mode.

* * * * *

UNITED STATES PATENT AND TRADEMARK OFFICE
CERTIFICATE OF CORRECTION

PATENT NO. : 10,271,067 B2
APPLICATION NO. : 14/389927
DATED : April 23, 2019
INVENTOR(S) : Sjöberg et al.

It is certified that error appears in the above-identified patent and that said Letters Patent is hereby corrected as shown below:

In the Specification

In Column 5, Lines 40-41, delete "log 2_min_transform_blocksize_minus2" and insert -- log 2_min_transform_block_size_minus2 --, therefor.

In Column 5, Line 52, delete "log 2_diff_max_min_transform_block size." and insert -- log 2_diff_max_min_transform_block_size. --, therefor.

In Column 5, Lines 56-57, delete "log 2_diff_max_min_transform_block size" and insert -- log 2_diff_max_min_transform_block_size. --, therefor.

In Column 9, Line 29, delete "log 2_diff_max_min_transform_block size_intra ue(v)" and insert -- log 2_diff_max_min_transform_block_size_intra ue(v) --, therefor.

In Column 9, Line 49, delete "log 2_diff_max_min_transform_block size," and insert -- log 2_diff_max_min_transform_block_size, --, therefor.

In Column 9, Line 61, delete "transform_blocksize_intra," and insert -- transform_block_size_intra, --, therefor.

In Column 11, Line 67, delete "log 2_diff_max_min_transform_block size." and insert -- log 2_diff_max_min_transform_block_size. --, therefor.

In Column 12, Lines 44-45, delete "log 2_min_transform_block size_minus2+2+log 2_diff_max_min_transform_block size" and insert -- "log 2_min_transform_block_size_minus2+2+log 2 diff_max_min_transform_block_size. --, therefor.

In Column 17, Lines 66-67, delete "(ref score-assessment_score)." and insert -- (ref_score-assessment_score). --, therefor.

Signed and Sealed this
Thirtieth Day of July, 2019

Andrei Iancu
*Director of the United States Patent and Trademark Office*

In Column 20, Line 33, delete "2_diff_max_min_transform_block size_intra," and insert -- 2_diff_max_min_transform_block_size_intra, --, therefor.

In Column 20, Line 37, delete "log 2_diff_max_min_transform_block size" and insert -- log 2_diff_max_min_transform_block_size --, therefor.

In Column 20, Line 38, delete "log 2_diff_max_min_transform_block size_intra," and insert -- log 2_diff_max_min_transform_block_size_intra, --, therefor.

In Column 20, Line 43, delete "2_diff_max_min_transform_block size_intra." and insert -- 2_diff_max_min_transform_block_size_intra. --, therefor.

In Column 21, Line 9, delete "log 2_diff_max_min_transform_block size" and insert -- log 2_diff_max_min_transform_block_size --, therefor.

In Column 25, Line 3, delete "block size_intra," and insert -- block_size_intra, --, therefor.

In Column 25, Line 39, delete "min_transform_block size_intra" and insert -- min_transform_block_size_intra --, therefor.

In Column 25, Line 40, delete "transform_block size," and insert -- transform_block_size, --, therefor.

In Column 26, Line 19, delete "max_min_transform_block size" and insert -- max_min_transform_block_size --, therefor.

In Column 27, Lines 2-3, delete "transform_block size_minus2+2+min(log2_diff_max_min_transform_block size, 2)." and insert -- transform_block_size_minus2+2+min(log2_diff_max_min_transform_block_size, 2). --, therefor.

In Column 27, Lines 8-9, delete "log 2_min_transform_block size_minus2," and insert -- log 2_min_transform_block_size_minus2, --, therefor.

In Column 27, Line 12, delete "min_transform_block size," and insert -- min_transform_block_size, --, therefor.

In Column 27, Line 18, delete "log 2_min_transform_block size_minus2," and insert -- log 2_min_transform_block_size_minus2, --, therefor.

In Column 27, Line 19, delete "log 2_diff_max_min_transform_block size." and insert -- log 2_diff_max_min_transform_block_size. --, therefor.

In Column 27, Line 25, delete "2_diff_max_min_transform_block size," and insert -- 2_diff_max_min_transform_block_size, --, therefor.

In the Claims

In Column 33, Line 55, in Claim 14, delete "slices:" and insert -- slices; --, therefor.